(12) United States Patent
Ishitani et al.

(10) Patent No.: US 11,728,756 B2
(45) Date of Patent: Aug. 15, 2023

(54) CONTROL DEVICE

(71) Applicants: Tomoya Ishitani, Tokyo (JP); Yuki Takahashi, Tokyo (JP)

(72) Inventors: Tomoya Ishitani, Tokyo (JP); Yuki Takahashi, Tokyo (JP)

(73) Assignee: Minebea Mitsumi Inc., Nagano (JP)

( * ) Notice: Subject to any disclaimer, the term of this patent is extended or adjusted under 35 U.S.C. 154(b) by 0 days.

(21) Appl. No.: 17/065,518

(22) Filed: Oct. 8, 2020

(65) Prior Publication Data

US 2021/0111654 A1 Apr. 15, 2021

(30) Foreign Application Priority Data

Oct. 9, 2019 (JP) .................................. 2019-185840

(51) Int. Cl.
*H02P 13/00* (2006.01)
*H02P 8/22* (2006.01)
*H02P 25/032* (2016.01)

(52) U.S. Cl.
CPC .................................. *H02P 25/032* (2016.02)

(58) Field of Classification Search
CPC .................................. H02P 6/12; H02P 6/182
See application file for complete search history.

(56) References Cited

U.S. PATENT DOCUMENTS

| 2010/0309141 | A1 | 12/2010 | Cruz-Hernandez et al. |
| 2015/0169061 | A1 | 6/2015 | Odajima et al. |
| 2015/0332565 | A1* | 11/2015 | Cho ..................... B06B 1/0644 |
| | | | 310/317 |
| 2018/0246571 | A1 | 8/2018 | Jeitner et al. |
| 2019/0033971 | A1* | 1/2019 | Reynolds .............. G06F 3/0443 |
| 2019/0163277 | A1 | 5/2019 | Kanai |

FOREIGN PATENT DOCUMENTS

| JP | 2015-070729 | 4/2015 |
| JP | 2016-163854 | 9/2016 |
| WO | WO 2019/150737 | 8/2019 |

OTHER PUBLICATIONS

European Search Report and the European Search Opinion dated Mar. 5, 2021 From the European Patent Office Re. Application No. 20200780.3. (12 Pages).
Communication Pursuant to Article 94(3) EPC dated Aug. 11, 2022 From the European Patent Office Re. Application No. 20200780.3. (7 Pages).

\* cited by examiner

*Primary Examiner* — Muhammad S Islam
*Assistant Examiner* — Charles S Laughlin

(57) ABSTRACT

Provided is a control device for controlling an electromagnetic actuator that vibrates an operation device by driving the operation device supported by an elastic support part so as to be elastically vibrated in one direction in a vibrating direction thereof, the control device comprising: a current pulse supply unit configured to supply a driving current pulse to a coil of the electromagnetic actuator as a driving current for driving the operation device in accordance with a touch operation of the operation device, wherein the current pulse supply unit supplies the drive current pulse capable of starting the elastic vibration as a main driving current pulse, and then supplies the drive current pulse capable of adjusting attenuation period of the elastic vibration as a sub-driving current pulse.

9 Claims, 17 Drawing Sheets

CONTROL DEVICE

CROSS REFERENCE TO RELATED APPLICATIONS

This application is entitled to or claims the benefit of Japanese Patent Application No. 2019-185840, filed on Oct. 9, 2019, the disclosure of which including the specification, drawings and abstract is incorporated herein by reference in its entirety.

TECHNICAL FIELD

The present invention relates to a control device for driving an electromagnetic actuator.

BACKGROUND ART

Conventionally, at the time of operating a touch panel that is a sensing panel, there is known a configuration in which vibration is given by a vibration actuator as a touch operation feeling (a feeling of being operated by touching) to a finger pulp or the like of an operator who touches a display screen displayed on the touch panel (see PTL 1 and PTL 2).

PTL 1 discloses a portable terminal device in which a vibration actuator is mounted on a back surface of a touch panel via a vibration transmitting part. In this vibration actuator, a movable part is disposed inside a housing fixed to the vibration transmitting part to be reciprocally movable along a guide shaft disposed vertically with respect to the touch panel. This vibration actuator gives vibration to the finger pulp that is touching the touch panel via the vibration transmitting part by causing movable part to collide with the housing in response to operations to the touch panel.

Further, PTL 2 discloses a vibration presenting device that gives vibration in response to operations to a touch panel. In this vibration presenting device, a voice coil motor for generating vibration, a support part that is disposed with a vibration panel and compressed by a prescribed force, a damper that gives breaking work on the vibration of a vibration part, and a spring that gives a compression force to the support part and the damper are provided in parallel between the vibration panel that is the vibration part presenting vibration and a housing that supports the vibration panel.

CITATION LIST

Patent Literature

PTL 1: Japanese Patent Application Laid-Open No. 2015-070729
PTL 2: Japanese Patent Application Laid-Open No. 2016-163854

SUMMARY OF INVENTION

Technical Problem

However, in the vibration presenting device, it is desired to express vibrations that provide various touch operation feelings depending on application and use situation of an operation device.

The present invention has been made in view of the above problems, and an object of the present invention is to provide a control device capable of expressing vibrations of various touch operation feelings.

Solution to Problem

A control device of the present invention for controlling an electromagnetic actuator that vibrates an operation device by driving the operation device supported by an elastic support part so as to be elastically vibrated in one direction in a vibrating direction thereof, the control device comprising:
a current pulse supply unit configured to supply a driving current pulse to a coil of the electromagnetic actuator as a driving current for driving the operation device in accordance with a touch operation of the operation device,
wherein the current pulse supply unit is configured to supply the drive current pulse capable of starting the elastic vibration as a main driving current pulse, and then supply the drive current pulse capable of adjusting attenuation period of the elastic vibration as a sub-driving current pulse.

Advantageous Effects of Invention

The present invention is capable of expressing vibrations of various touch operation feelings.

DESCRIPTION OF EMBODIMENTS

Hereinafter, embodiments of the present invention will be described in detail by referring to the accompanying drawings.

An orthogonal coordinate system (X, Y, Z) is used for explanation in the present embodiments. The same orthogonal coordinate system (X, Y, Z) is also used for showing in drawings described later. Hereinafter, the width, length, and height of vibration presenting device 200 having control device 1 are lengths in X-direction, Y-direction, and Z-direction, respectively. The width, length, and height of electromagnetic actuator 10 are also lengths in X-direction, Y-direction, and Z-direction, respectively. In addition, a plus side in Z-direction is a direction to give vibration feedback to an operator, which is described as "upper side". A minus side in Z-direction is a direction to be pressed when the operator operates, which is described as "lower side".

(Basic Configuration of Vibration Presenting Device 200 Using Control Device 1)

Figure 1:
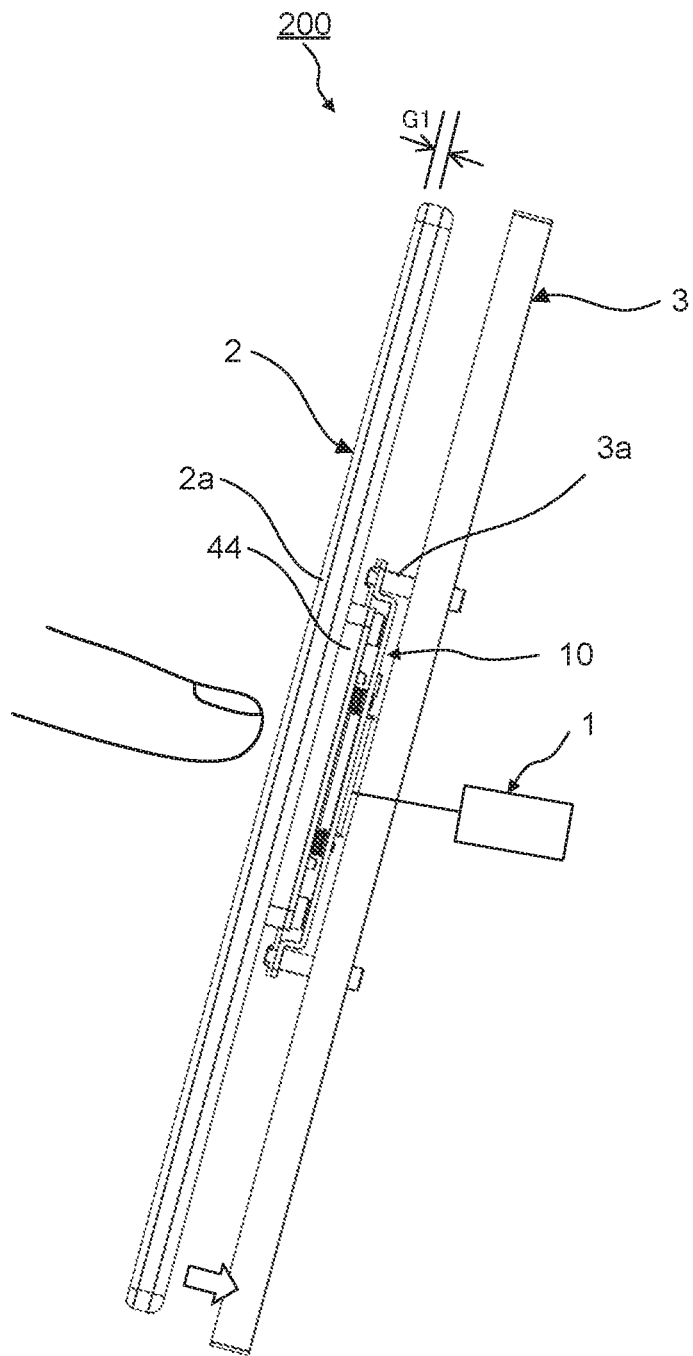
FIG. 1 is a side view showing a vibration presenting device having a control device according to an embodiment of the present invention.

Vibration presenting device 200 shown in FIG. 1 includes control device 1, electromagnetic actuator 10 that is controlled driving by control device 1, and an operation device (touch panel 2) that is performed a touch operation by an operator. In vibration presenting device 200, vibration is given to the operation device in response to the touch operation to the operation device of the operator. That is, a touch operation feeling (also referred to as "haptic feeling") is given to the operator who touches and operates the operation device via the operation device. In the present embodiment, the operation device is touch panel 2 which displays a screen and is operated by touching the screen. Touch panel 2 is a touch panel such as an electrostatic type, a resistive film type, and an optical type. Touch panel 2 detects a touch position of the operator. Touch panel 2 is controlled by control device 1. Control device 1 can obtain the touch position of the user through a touch panel control part which is not illustrated. Further, the screen of touch panel 2 may comprise a display part such as a liquid crystal system, an organic EL system, an electronic paper system, a plasma system, and may be controlled by control device 1. Control device 1 controls a display information control part which is not illustrated and presents image corresponding to the type of presentation vibration on the screen to the operator.

Vibration presenting device 200 is used, for example, as an electronic device, as a touch panel device of a car navigation system. Vibration presenting device 200 functions as a device that presents vibration to the operator who operates by touching screen 2a of touch panel 2. At this time, any electronic device that gives the haptic feeling to the operator by presenting vibration to the operator who touches a vibration object may be used as vibration presenting device 200. For example, vibration presenting device 200 may be an image device such as a smart phone, a tablet-type computer, a TV, or the like, a game machine with a touch panel, a game controller with a touch panel, or the like.

In the present embodiment, in vibration presenting device 200, when screen 2a of touch panel 2 is operated by touching the finger pulp or the like of the operator to screen 2a of touch panel 2, control device 1 drives electromagnetic actuator 10 to vibrate in response to the operation. This vibration gives the haptic feeling to the operator. Control device 1 of the present embodiment gives various types of the haptic feelings corresponding to a display image operated by the operator. For example, control device 1 gives the haptic feeling as a mechanical switch such as a haptic switch, alternate type switch, momentary switch, toggle switch, sliding switch, rolling switch, DIP switch and a locker switch. Further, control device 1 may also give the haptic feeling of the switch with different degrees of push-in in a push type switch.

In vibration presenting device 200, an operation device, which does not have a display function and can be simply touched and operated by the operator, may be used instead of touch panel 2 as the operation device.

In vibration presenting device 200 shown in FIG. 1, electromagnetic actuator 10 is disposed between touch panel 2 and base 3 as a back surface part of the device disposed at the back surface side of touch panel 2. Control device 1 may be provided in electromagnetic actuator 10 itself or base 3.

Touch panel 2, at the back side thereof, is fixed to surface-part fixing part 44 of movable part 40 (see FIG. 2) of electromagnetic actuator 10. Further, base 3 is disposed to face touch panel 2, fixing part 30 of electromagnetic actuator 10 is fixed to base 3 via pillar parts 3a. Thus, electromagnetic actuator 10 is disposed so as to connect each other between each of the central portion of touch panel 2 and base 3.

Touch panel 2 itself is driven integrally with movable part 40 of electromagnetic actuator 10. When the operator performs an operation by pressing the screen of touch panel 2, the direction in which the finger or the like of the operator touches the screen, for example, the direction pressing perpendicularly to the screen of touch panel 2 is the same direction as the Z direction which is the vibrating direction of movable part 40 in electromagnetic actuator 10.

Thus, according to vibration presenting device 200 in which control device 1, touch panel 2 and electromagnetic actuator 10 are mounted, touch panel 2 can be directly vibrated because touch panel 2 can be directly operated, that is, touch panel 2 is driven together with movable part 40 in the same direction as a touching direction of the finger.

Therefore, when an image such as the mechanical switch displayed on touch panel 2 is operated by touching, moving movable part 40 makes it possible to give a vibration to be an operation feeling which corresponds to the image, for example, a vibration to be a touch operation feeling same as the operation feeling when an actual mechanical switch is operated. This makes it possible to express a comfortable operation.

<Entire Configuration of Electromagnetic Actuator 10>

Figure 2:
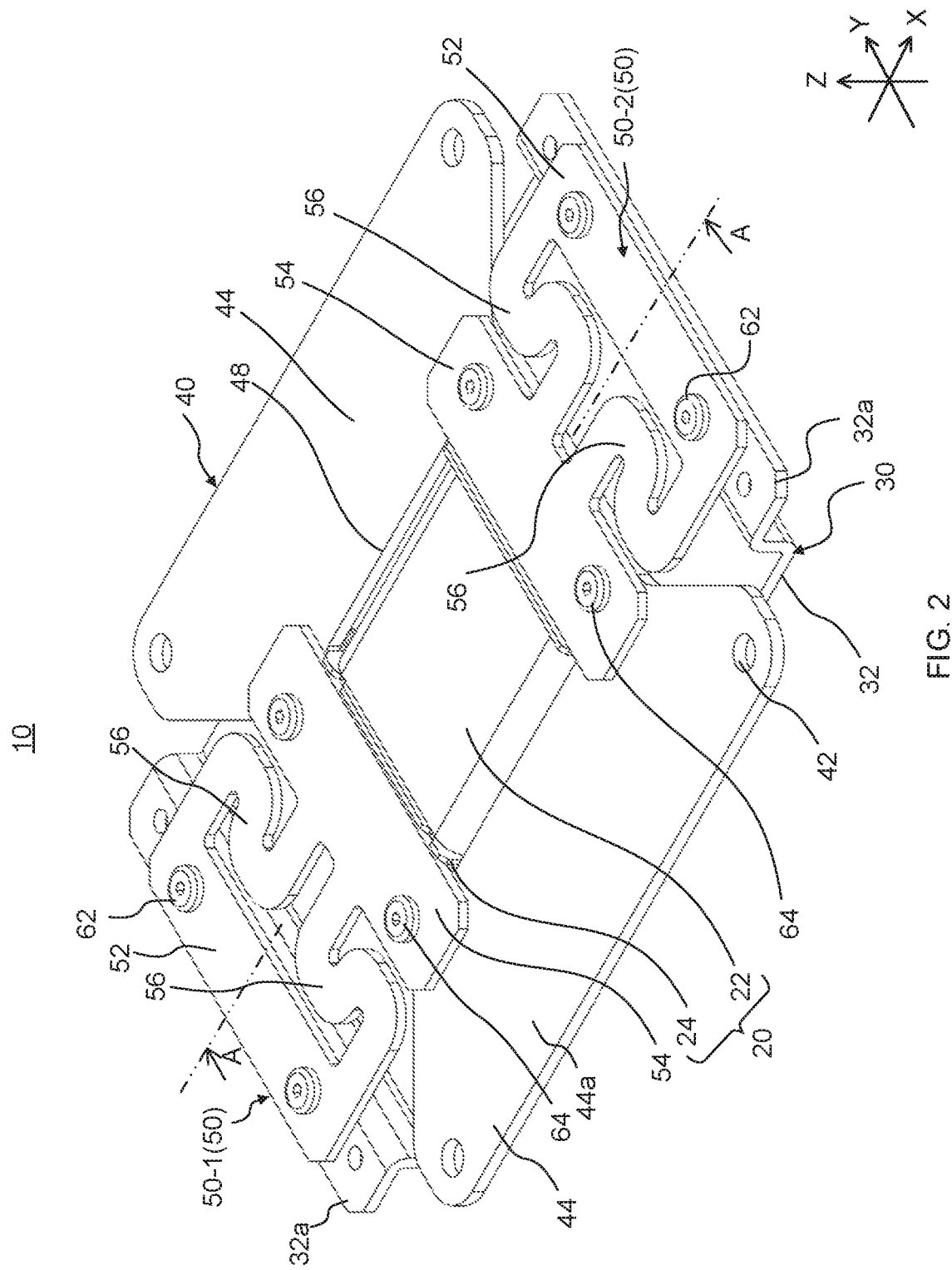
FIG. 2 is a plan side external perspective view of an electromagnetic actuator as an example which is controlled driving by the control device according to an embodiment of the present invention.
Figure 3:
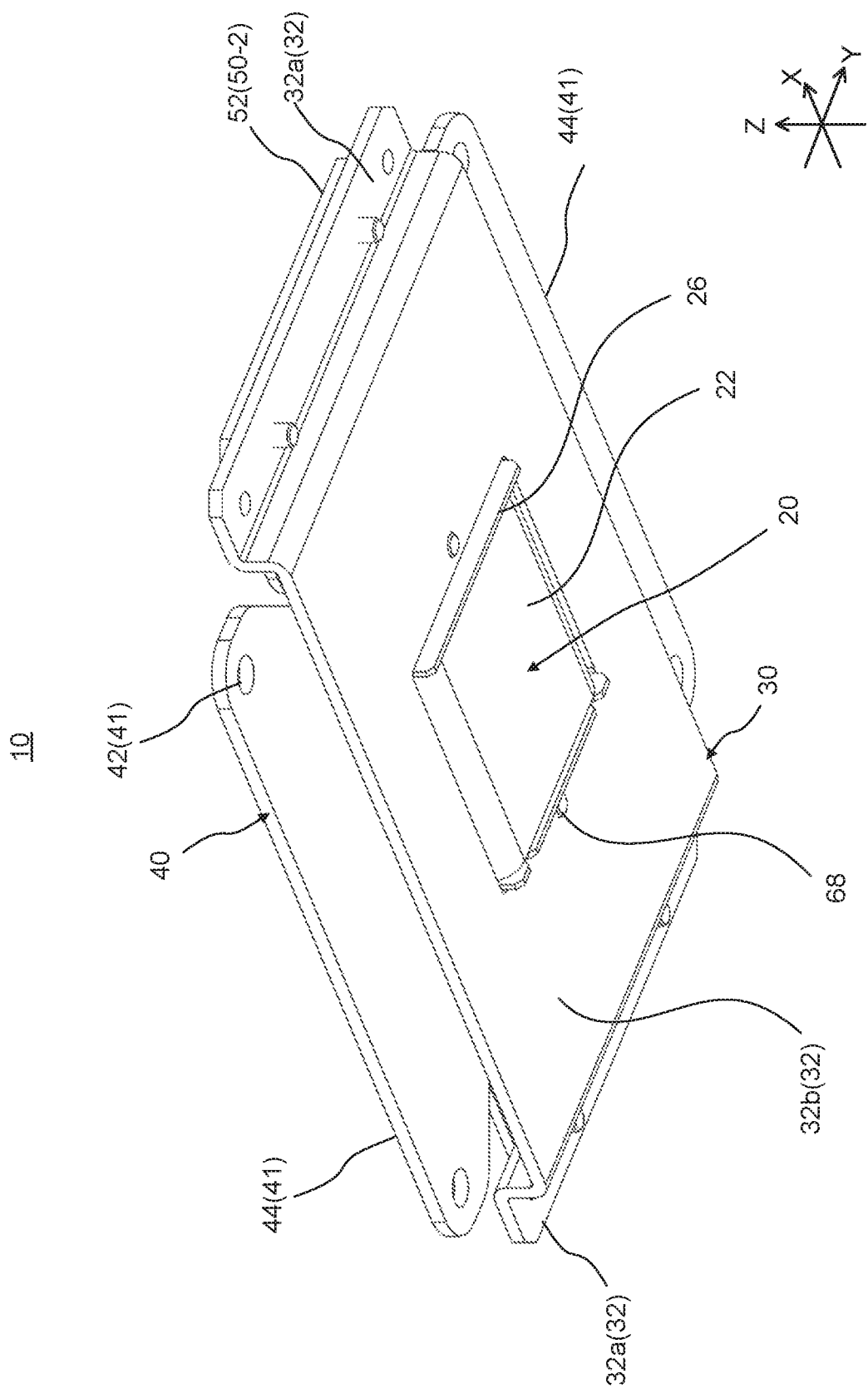
FIG. 3 is a bottom side external perspective view of the same electromagnetic actuator.
Figure 4:
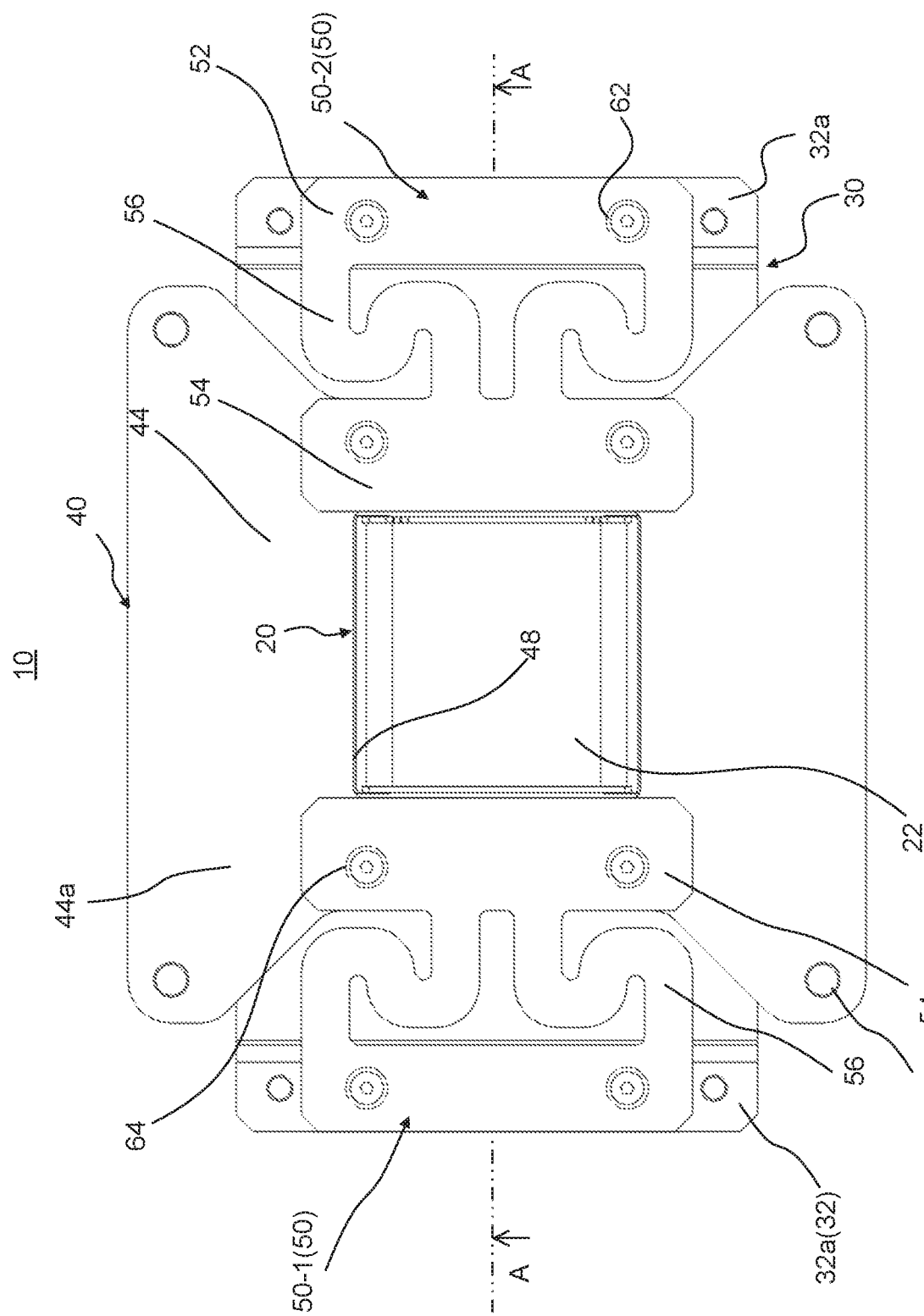
FIG. 4 is a plan view of the same electromagnetic actuator.
Figure 5:
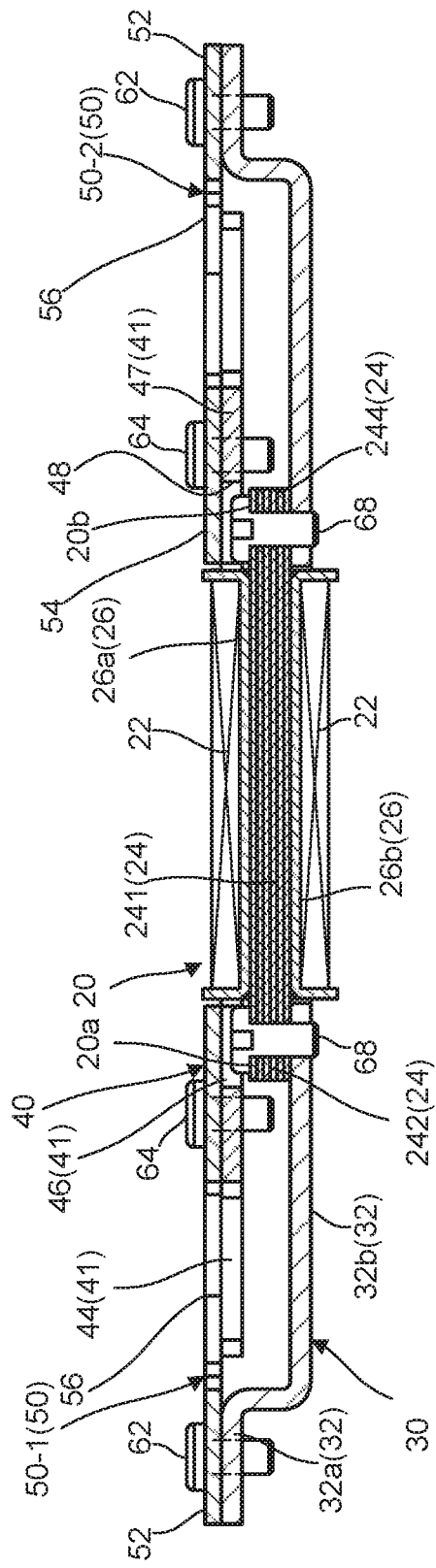
FIG. 5 is a cross-sectional view taken along the line A-A of FIG. 4.
Figure 6:
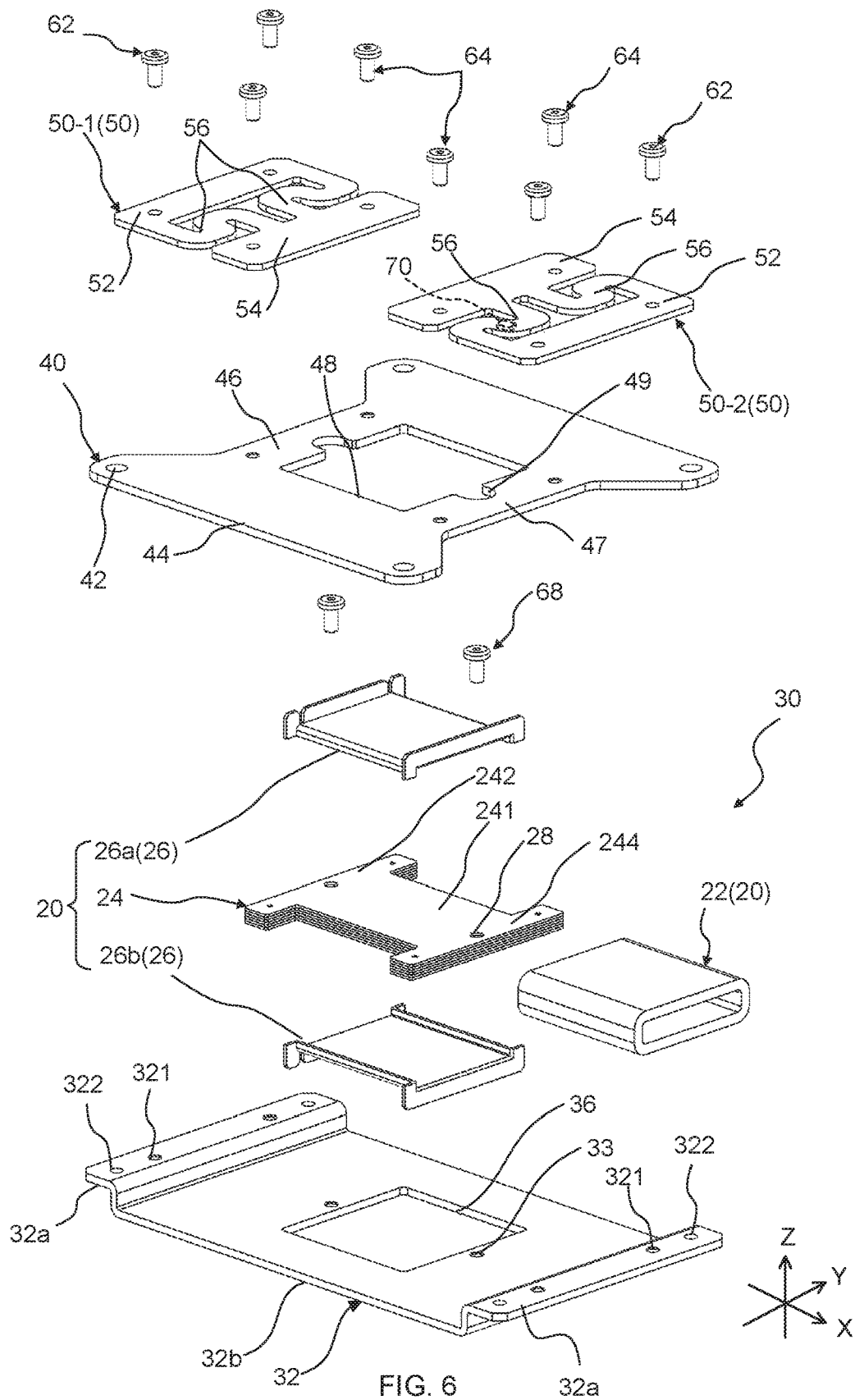
FIG. 6 is an exploded perspective view of the same electromagnetic actuator.
Figure 7:
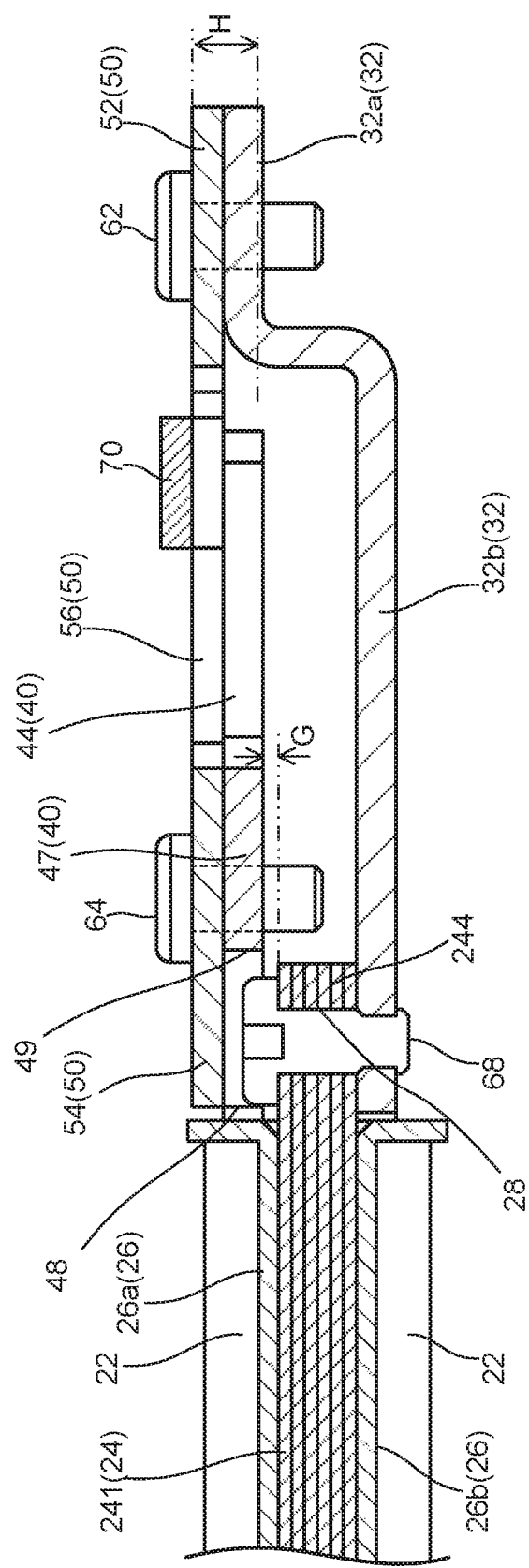
FIG. 7 is a cross-sectional view showing a situation in which a sensor is provided in the same electromagnetic actuator.

FIG. 2 is a plan side external perspective view of electromagnetic actuator 10 as an example which is controlled driving by the control device according to an embodiment of the present invention, FIG. 3 is a bottom side external perspective view of the same electromagnetic actuator 10, and FIG. 4 is a plan view of the same electromagnetic actuator. FIG. 5 is a cross-sectional view taken along the line A-A of FIG. 4, and FIG. 6 is an exploded perspective view of the same electromagnetic actuator 10 of the control device according to an embodiment of the present invention. Further, FIG. 7 is a cross-sectional view showing a situation in which a sensor is provided in the same electromagnetic actuator.

In the present embodiment, electromagnetic actuator 10 shown in FIGS. 2 to 7 is mounted in an electronic device to which control device 1 is applied, and functions as a vibration generating source of touch panel 2 (see FIG. 1) which is an example of an operation device.

Electromagnetic actuator 10 drives movable part 40 in one direction to move movable part 40 in the direction opposite to the one direction by an urging force of the members (plate-shaped elastic parts 50) for generating the urging force. This allows electromagnetic actuator 10 to function as a vibration actuator to move movable part 40 in a linear reciprocating motion (vibration).

It allows the operator who touches touch panel 2 to perform intuitive operations by transmitting vibrations to the operator to feel bodily sensations in response to touch operations by the operator on screen 2a of touch panel 2. Note that touch panel 2 includes a contact position output part that receives a touch operation of the operator on touch panel 2 and outputs the contact position thereof. Control device 1 outputs an actuator drive signal to electromagnetic actuator 10 and supplies a drive current so that vibrations corresponding to the touch operations are generated to supply the drive current based on a contact position information output by the contact position output part and a drive timing. Electromagnetic actuator 10 that receives the driving current from control device 1 generates vibrations corresponding to the contact positions output from touch panel 2 and transmits the vibrations to touch panel 2 to directly vibrate touch panel 2. In this way, the operation of the operator received touch panel 2 is received, and electromagnetic actuator 10 is driven correspondingly thereto.

Electromagnetic actuator 10 moves movable part 40 in one direction (e.g. the minus side in Z-direction) against the urging force by being input the actuator drive signal via control device 1. Further, the urging force is released, movable part 40 is moved in the other direction (the plus side in Z-direction) by the urging force by being stopped the input of the actuator drive signal to electromagnetic actuator 10. Electromagnetic actuator 10 vibrates movable part 40 and the operation device by inputting and stopping the actuator drive signal. Electromagnetic actuator 10 drives movable part 40 without using a magnet, and vibrates the operation device.

Note that, in the present embodiment, the actuator drive signal corresponds to a plurality of driving current pulses (also referred to as "current pulse") supplied to coil 22 as a driving current for driving movable part 40 and the operation device. In electromagnetic actuator 10, movable part 40 moves in one direction when the current pulse is supplied to coil 22.

Electromagnetic actuator 10 includes fixing part 30 having base part 32 and core assembly 20 formed by winding coil 22 around core 24, movable part 40 having yokes 41 of the magnetic material, and plate-shaped elastic parts (elastic support parts) 50 (50-1, 50-2) for elastically supporting movable part 40 to be movable in the vibrating direction with respect to fixing part 30.

Electromagnetic actuator 10 drives movable part 40 which is movably supported by plate-shaped elastic parts 50 so as to move in one direction with respect to fixing part 30. Further, the movement in one direction and the opposite direction of movable part 40 is performed by the urging force of plate-shaped elastic parts 50.

Specifically, electromagnetic actuator 10 vibrates yokes 41 of movable part 40 with core assembly 20. Specifically, movable part 40 is vibrated with the attraction force of energized coil 22 and excited core 24 by energized coil 22 as well as the urging force by plate-shaped elastic parts 50 (50-1, 50-2).

Electromagnetic actuator 10 is formed in a flat shape having the Z-direction as the thickness direction. Electromagnetic actuator 10 vibrates movable part 40 in the Z-direction, i.e., the thickness direction as the vibrating direction with respect to fixing part 30, thereby bringing closer or away one of front and back surfaces spaced apart from each other in the thickness direction of electromagnetic actuator 10 itself with respect to the other surface in the Z-direction.

In the present embodiment, electromagnetic actuator 10 moves movable part 40 to the minus side in Z-direction as the one direction by the attraction force of core 24, and moves movable part 40 to the plus side in Z-direction by the urging force of plate-shaped elastic parts 50 (50-1, 50-2).

In electromagnetic actuator 10 of the present embodiment, movable part 40 is elastically supported by a plurality of plate-shaped elastic parts 50 (50-1, 50-2) that is disposed along the direction orthogonal to the Z-direction at point symmetrical positions with respect to the moving center of movable part 40. However, the configuration is not limited thereto.

Plate-shaped elastic parts 50 are fixed between movable part 40 and fixing part 30, includes an elastically deformable bellows-shaped part, and elastically supports movable part 40 with respect to fixing part 30 to be movable in the direction opposing to at least one end of both ends (magnetic pole parts 242, 244) of core 24. As long as plate-shaped elastic parts 50 have such a configuration, plate-shaped elastic parts 50 may be provided in any way. For example, plate-shaped elastic parts 50 may elastically support movable part 40 with respect to fixing part 30 (core assembly 20) to be movable in the direction opposing to one end (magnetic pole part 242 or magnetic pole part 244) of core 24. Further, plate-shaped elastic parts 50-1, 50-2 may be disposed line symmetrically with respect to the center of movable part 40, and two or more plate-shaped elastic parts 50 may be used. Each of plate-shaped elastic parts 50-1 and 50-2 are fixed to fixing part 30 at one end side and fixed to movable part 40 at the other end side to movably support movable part 40 with respect to fixing part 30 in the vibrating direction (Z-direction, and it is up-and-down direction herein).

<Fixing Part 30>

As shown in FIGS. 5 to 9, fixing part 30 includes core assembly 20 having coil 22 and core 24, and base part 32.

Base part 32 has core assembly 20 fixed thereto and supports movable part 40 via plate-shaped elastic parts 50 (50-1, 50-2) to be movable in the vibrating direction. Base part 32 is a flat-shape member, and forms the bottom surface of electromagnetic actuator 10. Base part 32 includes attaching parts 32a to which one end of each of plate-shaped elastic parts (50-1, 50-2) are fixed so as to sandwich core assembly 20. Each of attaching parts 32a is disposed with a same space provided from core assembly 20. Note that the space is a space to be a deforming area of plate-shaped elastic parts 50 (50-1, 50-2).

Attaching parts 32a include fixing holes 321 for fixing plate-shaped elastic parts 50 (50-1, 50-2) and fixing holes 322 for fixing base part 32 to base 3 (see FIG. 1). Fixing holes 322 are provided at both ends of attaching parts 32a so as to sandwich fixing holes 321. Thereby, base part 32 is entirely and stably fixed to base 3 (see FIG. 1).

In the present embodiment, base part 32 is formed by processing a sheet metal and configured such that one side part and the other side part as attaching parts 32a are spaced apart from each other in the width direction with bottom surface part 32b interposed therebetween. A recessed part having bottom surface part 32b lower in height than that of attaching parts 32a is provided between attaching parts 32a. Inside the recessed part, that is, the space on the top surface side of bottom surface part 32b is for securing the elastic deforming area of plate-shaped elastic parts 50 (50-1, 50-2), and for securing a movable area of movable part 40 supported by plate-shaped elastic parts 50 (50-1, 50-2).

Bottom surface part 32b is a rectangular shape, opening part 36 is formed in the center thereof, and core assembly 20 is located inside opening part 36.

Opening part 36 is a shape corresponding to the shape of core assembly 20. Opening part 36 is formed in a square shape in the present embodiment. Thereby, entire electromagnetic actuator 10 can be shaped substantially into a square shape on a plan view by disposing core assembly 20 and movable part 40 in the center of electromagnetic actuator 10. Note that opening part 36 may be a rectangular shape (including a square shape).

Split body 26b of bobbins 26 on the lower side of core assembly 20 and a lower-side part of coil 22 are inserted inside opening part 36, and fixed such that core 24 is located on bottom surface part 32b on a side view. Thereby, length (thickness) in the Z-direction becomes decreased as compared with a configuration where core assembly 20 is attached on bottom surface part 32b. Further, core assembly 20 is firmly fixed in a state where it is hard to come off from bottom surface part 32b because a part of core assembly 20, that is, a part of the bottom surface side herein, is fixed while being fitted into opening part 36.

Core assembly 20 is configured by winding coil 22 around circumference of core 24 via bobbins 26.

Core assembly 20 vibrates (linearly reciprocates in the Z-direction) yokes 41 of movable part 40 in cooperation with plate-shaped elastic parts 50 (50-1, 50-2) when coil 22 is energized.

In the present embodiment, core assembly 20 is formed in a rectangular plate-shaped. Magnetic pole parts 242 and 244 are disposed in both side portions of the rectangular plate-shaped spaced from each other in the longitudinal direction.

These magnetic pole parts 242 and 244 are disposed so as to be able to oppose to attracted surface parts 46 and 47 of movable part 40 with gap G provided therebetween in the X-direction. In the present embodiment, counter surfaces (counter surface parts) 20a, 20b as the upper surfaces are diagonally adjacent to the bottom surfaces of attracted surface parts 46, 47 of yokes 41 in the vibrating direction (Z-direction) of movable part 40.

As shown in FIG. 2, core assembly 20 is fixed to base part 32 with a winding axis of coil 22 aligned toward the opposing direction (X-direction perpendicular to the vibrating direction) of spaced attaching parts 32a in base part 32. In the present embodiment, core assembly 20 is disposed in the center of base part 32, specifically in the center of bottom surface part 32b. As shown in FIGS. 3 to 9, core assembly 20 is fixed to bottom surface part 32b such that core 24 is located on the bottom surface over opening part 36 while being in parallel to bottom surface part 32b. Core assembly 20 is fixed in a state where coil 22 and the part (core main body 241) to which coil 22 is wound are located within opening part 36 of base part 32. Specifically, core assembly 20 is fixed to bottom surface part 32b by fastening screw 68 through fixing holes 28 and fastening holes 33 (see FIG. 6) of bottom surface part 32b in a state where coil 22 is disposed in opening part 36. Core assembly 20 and bottom surface part 32b are joined at two points on the axial center of coil 22 by sandwiching coil 22 with screws 68 as a fastening member at both side parts of opening part 36 spaced from each other in the Y-direction and magnetic pole parts 242, 244.

Coil 22 is a solenoid that is energized and generates a magnetic field at the time of driving electromagnetic actuator 10. Coil 22 together with core 24 and movable part 40 forms a magnetic circuit (magnetic path) that attracts and moves movable part 40. Note that power is supplied to coil 22 from an external power source via control device 1. For example, the power is supplied to coil 22 to drive electromagnetic actuator 10 by supplying a driving current from control device 1 to electromagnetic actuator 10.

Core 24 includes core main body 241 around which coil 22 is wound, and magnetic pole parts 242, 244 provided at both ends of core main body 241 and excited by energizing coil 22. Core 24 may be in any types of configuration as long as it is a configuration having the length with which the both ends can function as magnetic pole parts 242, 244 when coil 22 is energized. For example, while it is possible to employ a straight-type (I-type) tabular shape, core 24 of the present embodiment is formed in an H-type tabular shape on a plan view.

When formed as an I-type core, the area of surfaces (air gap side surface) on attracted surface parts 46, 47 side opposing to the both ends (magnetic pole parts) of the I-type core with air gap G provided therebetween becomes narrower. Thereby, magnetic resistance in the magnetic circuit may be increased, so that the conversion efficiency may be deteriorated. Further, when the bobbins are attached to the core, there may be no space or may only be a small space for positioning of the bobbins in the longitudinal direction of the core, so that it is necessary to provide the space for positioning separately. In the meantime, because core 24 is the H-type, the gap side surface in the both ends of core main body 241 can be expanded in the front-and-rear directions (Y-directions) longer than the width of core main body 241 around which coil 22 is wound, thereby making it possible to decrease the magnetic resistance and improve the efficiency of the magnetic circuit. Further, positioning of coil 22 can be performed by simply fitting bobbins 26 between portions of magnetic pole parts 242, 244 extended out from core main body 241, so that it is unnecessary to separately provide a positioning member of bobbins 26 for core 24.

In core 24, magnetic pole parts 242 and 244 are provided at each of the both ends of tabular core main body 241 around which coil 22 is wound by being projected toward the direction orthogonal to the winding axis of coil 22. Core 24 is of a magnetic material made of a soft magnetic material or the like, and formed from, for example, a silicon steel sheet, permalloy, ferrite or the like. Further, core 24 may also be made of electromagnetic stainless steel, a sintered material, an MIM (metal injection mold) material, a laminated steel sheet, an electrogalvanized steel sheet (SECC), or the like.

Magnetic pole parts 242 and 244 are excited by energizing coil 22, attract and move yokes 41 of movable part 40 spaced in the vibrating direction (Z-direction). Specifically, magnetic pole parts 242 and 244 attract, by a magnetic flux to be generated, attracted surface parts 46 and 47 of movable part 40 counter-disposed via gap G.

In the present embodiment, magnetic pole parts 242 and 244 are tabular bodies extended in the Y-direction that is the vertical direction with respect to core main body 241 extended in the X-direction. Magnetic pole parts 242 and 244 are lengthy in the Y-direction, so that the area of counter surfaces 20a and 20b opposing to yokes 41 are wider than the configuration formed in the both ends of core main body 241.

Bobbins 26 are disposed to surround core main body 241 of core 24 in the direction orthogonal to the vibrating direction. Bobbins 26 are formed from a resin material, for example. This makes it possible to secure electrical insulation with other metallic members (for example, core 24), so that reliability as the electric circuit can be improved. By using a resin of high fluidity for the resin material, formability can be improved so that the thickness can be decreased while securing the strength of bobbins 26. Note that split bodies 26a and 26b are mounted so as to sandwich core main body 241, so that bobbins 26 are formed in a cylindrical shape that covers the periphery of core main body 241. In bobbins 26, a flange is provided to the both ends of the cylindrical body so that coil 22 is defined so as to be located on the outer circumference of core main body 241.

<Movable Part 40>

Movable part 40 is disposed to oppose to core assembly 20 with gap provided therebetween in the direction orthogonal to the vibrating direction (Z-direction). Movable part 40 is provided to be able to reciprocally vibrate in the vibrating direction with respect to core assembly 20.

Movable part 40 includes yokes 41, and includes movable-part side fixing parts 54 of plate-shaped elastic parts 50-1 and 50-2 fixed to yokes 41.

Movable part 40 is disposed in a state (standard normal position) being hanged while being spaced substantially in parallel and to be movable in the approaching/leaving directions (Z-directions) with respect to bottom surface part 32b via plate-shaped elastic parts 50 (50-1, 50-2).

Yoke 41 is a magnetic path of the magnetic flux generated when energized to coil 22, and is a tabular body made of a magnetic material such as electromagnetic stainless steel, a sintered material, an MIM (metal injection mold) material, a laminated steel sheet, an electrogalvanized steel sheet (SECC), or the like. In the present embodiment, yoke 41 is formed by processing an SECC sheet.

Yokes 41 are hanged to oppose to core assembly 20 with gap G (see FIG. 7) provided therebetween in the vibrating direction (Z-direction) by plate-shaped elastic parts 50 (50-1, 50-2) fixed to respective attracted surface parts 46 and 47 spaced from each other in the X-direction.

Yokes 41 include surface-part fixing parts 44 to which the operation device (see touch panel 2 shown in FIG. 1) is attached, and attracted surface parts 46 and 47 counter-disposed with respect to magnetic pole parts 242 and 244.

Yoke 41 is formed in a rectangular frame shape having opening part 48 in the center thereof, and includes surface-part fixing part 44 and attracted surface parts 46, 47 surrounding opening part 48.

Opening part 48 opposes to coil 22. In the present embodiment, opening part 48 is located right above coil 22, and the opening shape of opening part 48 is formed in a shape to which coil 22 part of core assembly 20 can be inserted when yokes 41 moves to bottom surface part 32b side.

By configuring yokes 41 to have opening part 48, the thickness of the entire electromagnetic actuator can be decreased as compared to a case having no opening part 48.

Further, core assembly 20 is located within opening part 48, so that yokes 41 are not disposed in the vicinity of coil 22. Therefore, it is possible to suppress deterioration in the conversion efficiency due to the magnetic flux leaked from coil 22, so that high output can be achieved.

Surface-part fixing part 44 includes fixing surface 44a that comes in surface-contact to fix touch panel 2 as an example of the operation device. Fixing surface 44a forms a trapezoid shape on a plan view, and surface-contacts with touch panel 2 that is fixed to surface-part fixing part 44 via fastening member such as a screw inserted into surface-part fixing holes 42.

Movable-part side fixing parts 54 of plate-shaped elastic parts 50-1 and 50-2 are fixed by being laminated, respectively, on attracted surface parts 46 and 47. Attracted surface parts 46 and 47 are provided with cutouts 49 functioning as clearance of the heads of screws 64 of core assembly 20 when moved to bottom surface part 32b side. Thereby, even when movable part 40 moves to bottom surface part 32b side and attracted surface parts 46, 47 approach magnetic pole parts 242, 244, attracted surface parts 46, 47 are not to be in contact with screws 68 that fix magnetic pole parts 242, 244 to bottom surface part 32b, so that movable areas of yokes 41 in the Z-direction can be secured for that.

<Plate-Shaped Elastic Parts 50 (50-1, 50-2)>

Plate-shaped elastic parts 50 (50-1, 50-2) movably support movable part 40 with respect to fixing part 30. Plate-shaped elastic parts 50 (50-1, 50-2) support the upper surface of movable part 40 so as to be parallel to each other at the same height as the upper surface of core assembly 20, or at the lower surface side of the upper surface of fixing part 30 (the upper surface of core assembly 20 in this embodiment). Plate-shaped elastic parts 50-1 and 50-2 have a symmetrical shape with respect to the center of movable part 40, and are members formed in the same manner in the present embodiment.

Plate-shaped elastic parts 50 are arranged yokes 41 substantially in parallel so as to face to magnetic pole parts 242 and 244 of core 24 of core assembly 20 with a gap G. Plate-shaped elastic parts 50 movably support the lower surface of movable part 40 in the vibrating direction at the position of bottom surface part 32b side of the substantially same height level as the height level of the upper surface of core assembly 20.

Plate-shaped elastic part 50 is a plate spring, and includes fixing-part side fixing part 52, movable-part side fixing part 54, and bellows-shaped elastic arm parts 56 that communicate fixing-part side fixing part 52 with movable-part side fixing part 54.

Plate-shaped elastic part 50 attaches fixing-part side fixing part 52 to the surface of attaching parts 32a, attaches movable-part side fixing parts 54 to the surfaces of the attracted surface parts 46 and 47 of yokes 41, and attaches movable part 40 with bellows-shaped elastic arm parts 56 parallel to bottom surface part 32b.

Fixing-part side fixing parts 52 are joined and fixed by screws 62 in surface contact with attaching parts 32a, and movable-part side fixing parts 54 are joined and fixed by screws 64 in surface contact with the attracted surface parts 46 and 47.

Bellows-shaped elastic arm part 56 is an arm part having a bellows-shaped part. Bellows-shaped elastic arm part 56 in the present embodiment has a shape which extends in the opposing direction of fixing-part side fixing parts 52 and movable-part side fixing parts 54 and folds back. In bellows-shaped elastic arm part 56, ends respectively joined to fixing-part side fixing parts 52 and movable-part side fixing parts 54 are formed at positions shifted in the Y direction. Bellows-shaped elastic arm parts 56 are disposed in a position of point symmetry or line symmetry with respect to the center of movable part 40.

Thereby, movable part 40 is supported from both sides by bellows-shaped elastic arm parts 56 having bellows-shaped springs, so that it is possible to disperse the stress at the time of elastic deformation. That is, plate-shaped elastic parts 50 can move movable part 40 in the vibrating direction (Z-direction) without tilting with respect to core assembly 20, thereby making it possible to improve reliability of the vibrating state.

Each of plate-shaped elastic parts 50 includes at least two or more bellows-shaped elastic arm parts 56. Thereby, compared to a case where each of plate-shaped elastic parts 50 includes only one bellows-shaped elastic arm part, plate-shaped elastic parts 50 make it possible to improve the reliability by dispersing the stress at the time of elastic deformation and to improve the stability by balancing the support for movable part 40 better.

Plate-shaped elastic parts 50 in the present embodiment are formed from a magnetic material. Further, movable-part side fixing parts 54 of plate-shaped elastic parts 50 are disposed at positions opposing to both ends (magnetic pole parts 242, 244) of core in a coil winding axis direction or on the upper side thereof and function as a magnetic path. In the present embodiment, movable-part side fixing parts 54 are fixed by being laminated on the upper side of the attracted surface parts 46 and 47. This makes it possible to increase thickness (Z-direction, the length of the vibrating direction) H (see FIG. 7) of the attracted surface parts 46 and 47 opposing to the magnetic pole parts 242, 244 of core assembly as the thickness of the magnetic material. The thickness of plate-shaped elastic parts 50 and the thickness of yokes 41 are the same, so that the cross sectional area of the magnetic material portion opposing to magnetic pole parts 242, 244 can be doubled. Thereby, compared to a case where the plate spring is nonmagnetic, it is possible to ease the degradation of properties due to magnetic saturation in magnetic circuits and to improve the output, by expanding the magnetic path of the magnetic circuit.

Note that electromagnetic actuator 10 of the present embodiment may be provided with a detection part that detects push-in amount of movable part 40 when the operation surface part fixed by surface-part fixing part 44 is operated. In the present embodiment, for example, as shown in FIGS. 6 to 7, strain detection sensor 70 that detects strain of plate-shaped elastic parts 50 may be provided as a detection part.

Strain detection sensor 70 detects strain of plate-shaped elastic parts 50 that are deformed when surface-part fixing part 44 is pushed into bottom surface part 32b side. Detected strain is output to the control part and the like, coil 22 is energized to attract and move yokes 41 such that movable part 40 moves in an amount corresponding to the strain.

In the present embodiment, if control device 1 can detect the touch of the operator to the operation device, the vibration feedback to the contact can be realized without determining the moving amount of the operation device to be operated. In addition, if the push-in amount against plate-shaped elastic parts 50 can be detected with the moving amount corresponding to the moving amount of the actual operation device, a more natural feeling can be expressed by using this detection result.

Further, strain detection sensor 70 may be used to adjust the vibration period of movable part 40 (touch panel 2, which is the operation device) when a drive current pulse is supplied by a current pulse supply unit of control device 1 based on the contact operation of the operator, i.e., the detection result of the sensor that detects the push-in amount of movable part 40. Further, apart from strain detection sensor 70, in conjunction with the display form of the contact position of the operator detected by touch panel 2, an operation signal indicating the operation state may be output to control device 1 so as to generate vibration corresponding to the display form, and control device 1 may be controlled accordingly.

Note that, in bellows-shaped elastic arm parts 56 of plate-shaped elastic parts 50, strain detection sensor 70 is attached to the vicinity of the base having large distortion, and placed to an area that does not interfere with the other member, so-called dead space. Note that, instead of strain detection sensor 70, a detection part for push-in detection such as an electrostatic capacity sensor which measures the distance to plate-shaped elastic parts 50 which are pushed in and displaced may be placed on bottom surface part 32b facing the deformable portion of plate-shaped elastic parts 50 under plate-shaped elastic parts 50.

Figure 8:
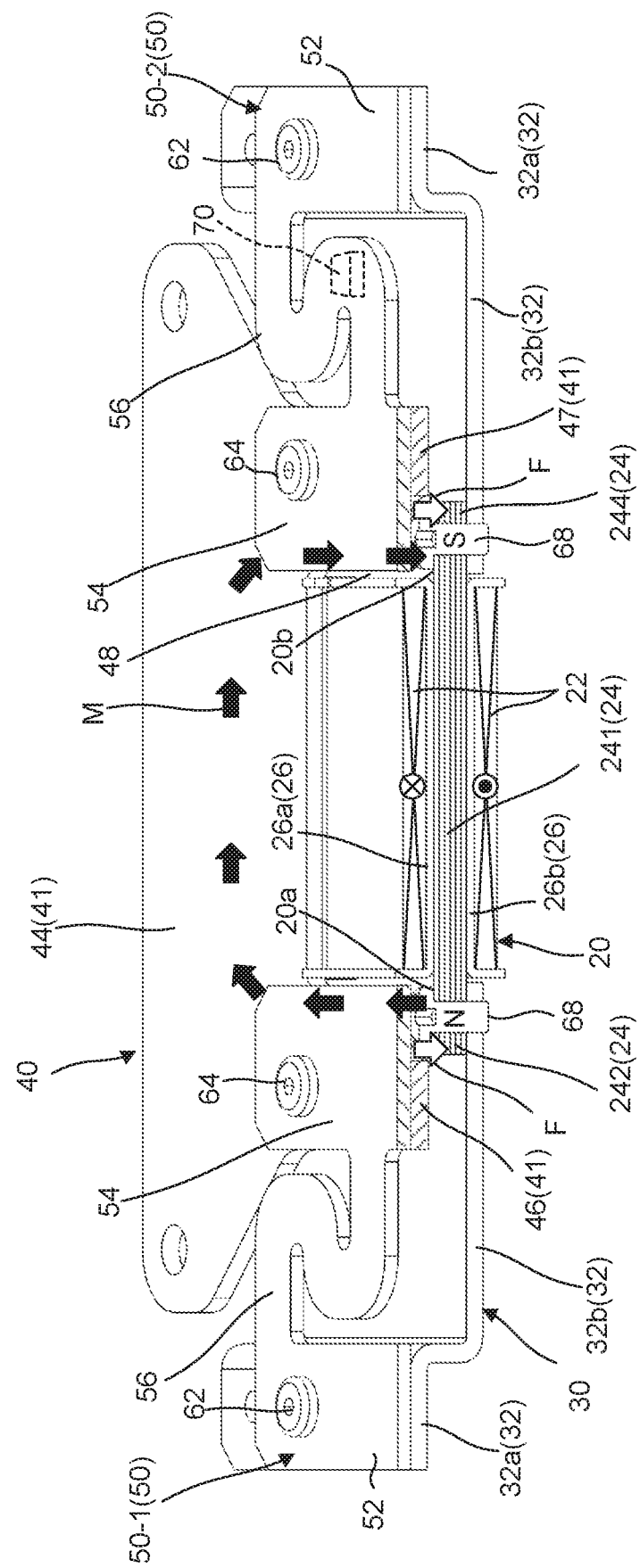
FIG. 8 is a diagram showing a magnetic circuit configuration of the same electromagnetic actuator.
Figure 9A:
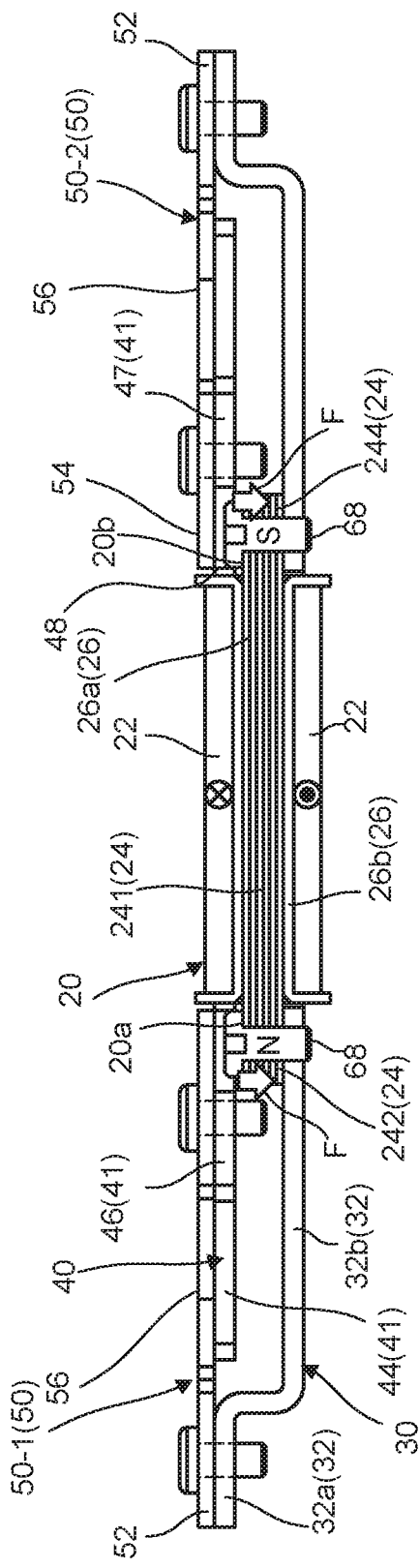
FIG. 9A is a diagram for explaining operation of the same electromagnetic actuator.
Figure 9B:
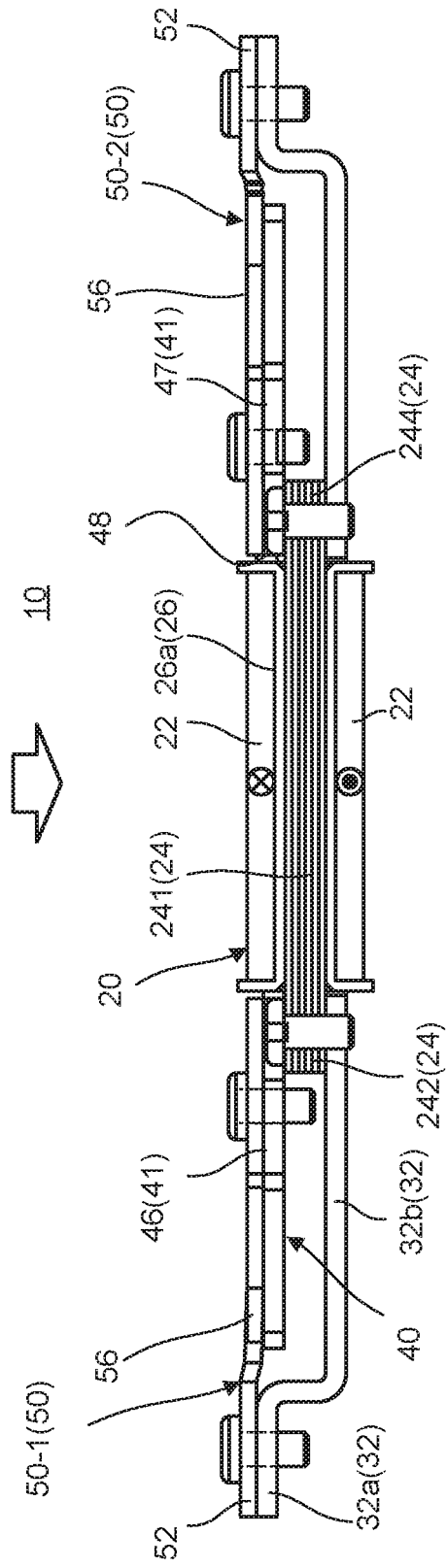
FIG. 9B is a diagram for explaining operation of the same electromagnetic actuator.

FIG. 8 is a diagram showing a magnetic circuit of electromagnetic actuator 10. Note that FIG. 8 is a perspective view of electromagnetic actuator 10 cut by the line A-A in FIG. 4. The portion of the magnetic circuit not shown has the same magnetic flux flow M as the portion of the magnetic circuit shown. Further, FIG. 9 is a cross-sectional view schematically showing the movement of movable part by the magnetic circuit. In particular, FIG. 9A is a diagram showing a state in which movable part 40 is held at a position separated from core assembly 20 by the plate-shaped elastic parts 50. FIG. 9B shows a movable part 40 which is moved is attracted to core assembly 20 side by the magnetomotive force by the magnetic circuit.

Specifically, when coil 22 is energized, core 24 is excited and a magnetic field is generated, thereby forming magnetic poles in both ends of core 24. For example, in FIG. 8, magnetic pole part 242 is the N-pole, and magnetic pole part 244 is the S-pole in core 24. Thereby, the magnetic circuit indicated by magnetic flux flow M is formed between core assembly 20 and yokes 41. Magnetic flux flow M in the magnetic circuit flows to attracted surface part 46 of opposing yokes 41 from magnetic pole part 242, passes through surface-part fixing part 44 of yokes 41, and reaches magnetic pole part 244 opposing to attracted surface part 47 from attracted surface part 47. In the present embodiment, plate-shaped elastic parts 50 are also of magnetic materials. Thereby, the magnetic flux (illustrated as magnetic flux flow M) flown to attracted surface part 46 passes through attracted surface part 46 of yokes 41 and movable-part side fixing parts 54, reaching attracted surface part 46 and both ends of movable-part side fixing parts 54 of plate-shaped elastic part 50-2 via surface-part fixing part 44 from both ends of attracted surface part 46.

Thereby, according to the principle of electromagnetic solenoid, magnetic pole parts 242, 244 of core assembly 20 generate attraction force F for attracting attracted surface parts 46, 47 of yokes 41. Thereupon, attracted surface parts 46, 47 of yokes 41 are attracted to both of magnetic pole parts 242, 244 of core assembly 20. Thereby, coil 22 is inserted into opening part 48 of yokes 41, and movable part 40 including yokes 41 moves in F-direction against the urging force of plate-shaped elastic parts 50 (see FIG. 9A and FIG. 9B).

In the meantime, when energization to coil 22 is stopped, the magnetic field disappears, attraction force F of core assembly 20 for movable part 40 is lost, and movable part 40 is moved back to the original position (moved to F-direction minus side) by the urging force of plate-shaped elastic parts 50.

By repeating such action described above, in electromagnetic actuator 10, movable part 40 reciprocally moves in a linear manner and generates vibration in the vibrating direction (Z-direction).

By reciprocating movable part 40 in a linear manner, touch panel 2 as the operation device to which movable part 40 is fixed, is also displaced in the Z direction following movable part 40. In the present embodiment, the displacement of movable part 40 due to driving, that is, the displacement G1 (see FIG. 1) of touch panel 2 ranges from 0.03 mm to 0.3 mm. The range of this displacement is a range in which vibration corresponding to the display pressed by the operator can be applied on screen 2a of touch panel 2 as the operation device. For example, when the display to be pressed by the operator on screen 2a is a mechanical button or various switches, the range of amplitude is such that the same haptic feeling can be given as when the mechanical button or various switches are actually pressed. This range is set when a small displacement of the amplitude of movable part 40 results in inadequate haptic feeling, and a large displacement of the amplitude of movable part 40 results in discomfort.

In electromagnetic actuator 10, it is possible to increase the efficiency of the magnetic circuit and achieve high output by disposing attracted surface parts 46, 47 of yokes 41 adjacent to magnetic pole parts 242, 244 of core assembly 20. Further, electromagnetic actuator 10 uses no magnet, so that a low-cost configuration can be achieved. Bellows-shaped springs that are plate-shaped elastic parts 50 (50-1, 50-2) enable dispersion of the stress, so that the reliability can be improved. Especially, because movable part 40 is supported by a plurality of plate-shaped elastic parts 50 (50-1, 50-2), more effective dispersion of the stress is possible. As described, electromagnetic actuator 10 is capable of providing a more direct sense of touch by driving up-and-down direction thereto to the operator who touches screen 2a in up-and-down direction.

Core assembly 20 having core 24 around which coil 22 is wound is fixed to fixing part 30. This core assembly 20 is disposed in opening part 48 of yokes 41 of movable part 40 which is movably supported in Z-direction by plate-shaped elastic parts 50 with respect to fixing part 30. Thereby, it becomes unnecessary to stack members provided for each of the fixing part and movable part in Z-direction (e.g., place the coil and magnet opposite each other in Z-direction) in order to generate magnetism to drive the movable part in Z-direction, so that the thickness in Z-direction can be reduced as the electromagnetic actuator. Further, by reciprocating linear movement of movable part 40, the operation device can give the vibration as the haptic feeling without using a magnet. Thus, the design becomes simple because the support structure is simple, it is possible to save space, it is possible to reduce the thickness of electromagnetic actuator 10. Further, because it is not an actuator using a magnet, it is possible to reduce the cost as compared with the configuration using a magnet.

Hereinafter, the driving principle of electromagnetic actuator 10 will simply be described. Electromagnetic actuator 10 can be driven by generating a resonance phenomenon with a pulse by using following motion expression and circuit expression. Note that the actions are not resonance driven but for expressing operational feeling of mechanical switches displayed on the touch panel. In the present embodiment, the actions are driven by inputting a plurality of current pulses through control device 1. Examples of the mechanical switch may be a haptic switch, alternate-type switch, a momentary switch, a toggle switch, a slide switch, a rotary switch, a DIP switch, and a rocker switch.

Note that movable part 40 in electromagnetic actuator 10 performs reciprocating motion based on Expressions (1) and (2).

[Expression 1]

$$m\frac{d^2x(t)}{dt^2} = K_f i(t) - K_{sp} x(t) - D\frac{dx(t)}{dt} \quad (1)$$

$m$: Mass [kg]

$x(t)$: Displacement [m]

$K_f$: Thrust constant [N/A]

$i(t)$: Current [A]

$K_{sp}$: Spring constant [N/m]

$D$: Attenuation coefficient [N/(m/s)]

[Expression 2]

$$e(t) = Ri(t) + L\frac{di(t)}{dt} + K_e\frac{dx(t)}{dt} \quad (2)$$

$e(t)$: Voltage [V]

$R$: Resistance [Ω]

$L$: Inductance [H]

$K_e$: Counter electromotive force constant [V/(rad/s)]

That is, mass "m" [kg], displacement "x(t)" [m], thrust constant "$K_f$" [N/A], current "i(t)" [A], spring constant "$K_{sp}$" [N/m], and attenuation coefficient "D" [N/(m/s)] in electromagnetic actuator 10 can be changed as appropriate within the range satisfying Expression (1). Also, voltage "e(t)" [V], resistance "R" [Ω], inductance "L" [H], and counter electromotive force constant "$K_e$" [V/(rad/s)] can be changed as appropriate within the range satisfying Expression (2).

As described, the drive of electromagnetic actuator 10 is determined based on mass "m" of movable part 40, and spring constant $K_{sp}$ of metal springs (elastic bodies; plate springs in the present embodiment) as plate-shaped elastic parts 50.

Further, in electromagnetic actuator 10, screws 62 and 64 are used for fixing base part 32 and plate-shaped elastic parts 50 and for fixing plate-shaped elastic parts 50 and movable part 40. Thereby, plate-shaped elastic parts 50 required to be firmly fixed to fixing part 30 and movable part 40 for allowing movable part 40 to drive can be firmly fixed mechanically in a state capable of reworking.

<Control Device 1>

Control device 1 controls electromagnetic actuator 10 that drives the operation device (touch panel 2 in FIG. 1) supported elastically to vibrate in one direction in the vibrating direction.

Control device 1 supplies a driving current to electromagnetic actuator 10 in response to the touch operation of the operation device to generate a magnetic field, and moves elastically vibratable movable part 40 in one direction with respect to fixing part 30, here in Z-direction minus side. Thus, when the operator touches the operation device, control device 1 gives vibrations as the haptic feeling. Note that the touch operation may be, for example, a signal indicating a touch condition input from touch panel 2, or a signal detected by strain detection sensor 70.

In the present embodiment, control device 1 supplies a plurality of current pulse trains to coil 22 as an electromagnetic actuator drive signal for driving electromagnetic actuator 10.

By supplying the current pulse to coil 22 by control device 1, movable part 40 is displaced by the magnetic attraction force against the urging force of plate-shaped elastic parts 50, by being drawn back to coil 22 side, that is, to Z-direction minus side. Following this, touch panel 2 also moves to Z-direction minus side with respect to base 3 which fixing part 30 is fixed to. Further, by stopping the supply of the driving current to coil 22, the urging force is released, a holding state of movable part 40 at a position in Z-direction minus side relative to a standard position is released. Thereby, movable part 40 is urged to move from its maximum displacement position in Z-direction minus side to the direction (Z-direction plus side) opposite to the drawn direction (Z-direction minus side) due to the urging force of the plate-shaped elastic parts 50, thus feeding back the vibration.

A plurality of current pulse trains has a main drive pulse that generates a main vibration corresponding to a touch operation, and a sub-drive pulse that forms an attenuation period of vibration due to the main drive pulse.

The main drive current pulse (hereinafter, also referred to as "main drive pulse") is supplied to coil 22 when the operator touches the operation device (screen 2a of touch panel 2 in FIG. 1) to drive electromagnetic actuator 10 to generate the main vibration fed back to the operator according to the touch operation.

The sub-drive pulse is supplied to coil 22 after the main drive pulse is supplied to form the vibration during the decay period of the main vibration due to the main drive pulse, that is, the remaining attenuation vibration of the fed-back vibration.

The main drive pulse may generate any magnitude of vibration as long as it constitutes the main vibration to be fed back to the operator in touch operation, and may be formed by a plurality of current pulses. Further, the sub-drive pulse is a drive pulse supplied to coil 22 after the supply of the main drive pulse. In the present embodiment, the sub-drive pulse has a brake pulse to shorten attenuation vibration (attenuation period of the vibration) after the feedback vibration by the main drive pulse, and a attenuation additional pulse to continue the vibration attenuation period after the vibration by the main drive pulse. Note that the sub-drive pulse may have at least one of a brake pulse and attenuation additional pulse.

Various types of vibrating shapes are generated by the amplitude of the main drive pulse and the sub drive pulse, the respective wavelengths, the respective supply timing, and the like, and supplied to electromagnetic actuator 10 as an actuator drive signal, thereby providing a feeling to the operator.

Control device 1 includes, for example, a current pulse supply unit, a voltage pulse application unit. The current pulse supply unit supplies a plurality of drive current pulses to coil 22 of electromagnetic actuator 10 as a drive current for driving the operation device in response to a touch operation of the operation device (touch panel 2).

In the present embodiment, the plurality of drive current pulses is a drive current pulse train as an actuator drive signal in which a main drive pulse and a sub drive pulse are combined into one set.

Control device 1 according to the present embodiment outputs a train of driving current pulses to coil 22 of electromagnetic actuator 10 when the operator touches the operation device (screen 2a of touch panel 2 in FIG. 1) to vibrate an electromagnetic actuator to give the haptic feeling to the operator. Details of the drive current pulse train including the main drive pulse and the drive current pulse will be described later.

The voltage pulse application unit intermittently applies a plurality of control voltage pulses each generating a plurality of drive current pulses (main drive pulse and a sub drive pulse (brake pulse and attenuation additional pulse)) constituting the actuator drive signal to the current pulse supply unit. Specifically, the voltage pulse application unit applies the main drive pulse as the main drive signal that starts the vibration having a predetermined amplitude and wavelength that is a main haptic feeling when the operator touches screen 2a. In addition, the voltage pulse application unit applies an adjust signal for the vibration attenuation period, which is sub-drive pulse, to the current pulse supply unit after applying main drive signal.

Figure 10:
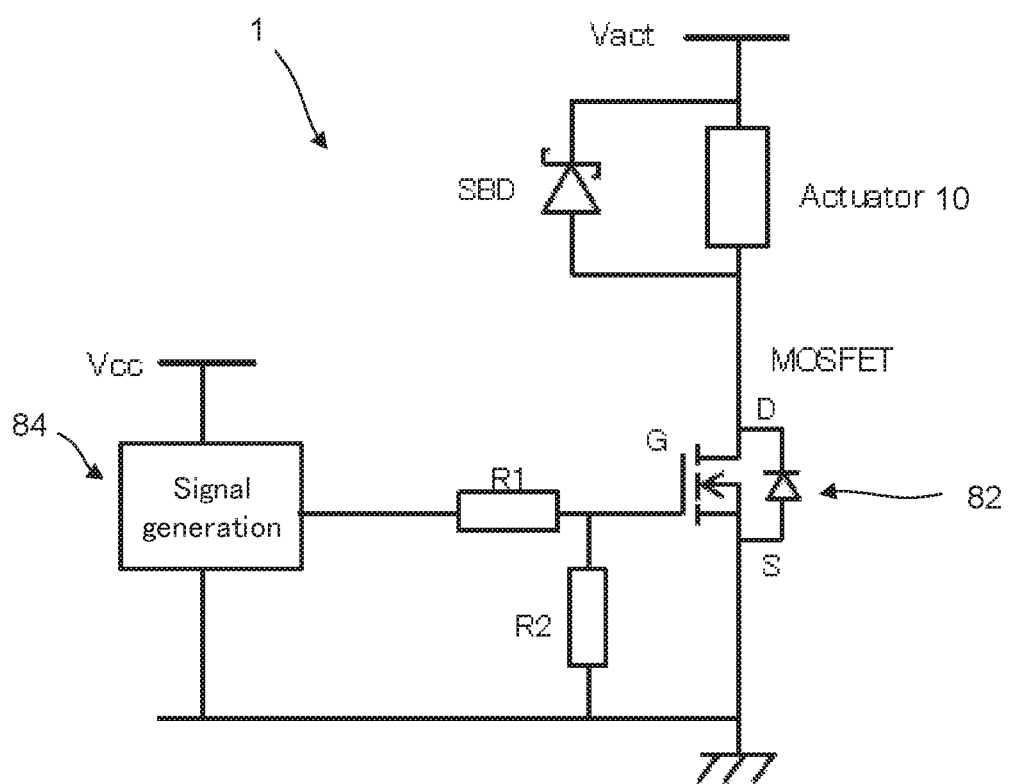
FIG. 10 is a diagram for explaining the control device according to an embodiment of the present invention.

FIG. 10 is a circuit diagram showing an example of configuration of a control device according to an embodiment of the present invention.

In control device 1 shown in FIG. 10, switching element 82 as a current pulse supply unit configured by a MOSFET (metal-oxide-semiconductor field-effect transistor), signal generating unit (Signal generation) 84 as a voltage pulse application unit, resistors R1, R2, and SBD (Schottky Barrier Diodes) are provided.

In control device 1, signal generating unit 84 connected to a power supply voltage Vcc is connected to a gate of switching element 82. Switching element 82 is a discharge changeover switch, connected to electromagnetic actuator 10 and SBD, and connected to the electromagnetic actuator (shown by [Actuator] in FIG. 10) to which a voltage is supplied from the power supply unit Vact.

Although not shown, control device 1 may include a CPU (Central Processing Unit), a ROM (Read Only Memory), a RAM (Random Access Memory), and the like for control operation of the components of the vibration presenting device. The CPU reads a program corresponding to processing content from the ROM, develops the program in the RAM, and cooperates with the developed program to control operation of the components of the vibration presenting device including electromagnetic actuator 10. At this time, various data including various vibrations attenuation periods pattern stored in a storage unit (not shown) are referenced. The storage unit (not shown) may be configured by, for example, a nonvolatile semiconductor memory (so-called flash memory) or the like. For example, in addition to main drive pulse waveform data, brake pulse waveform data and attenuation additional pulse waveform data of various plural pattern are stored in a storage unit, ROM, RAM, or the like. The ROM stores various programs for control the vibration presenting device including a vibration presenting program for presenting vibration by driving the electromagnetic actuator. The vibration presentation program includes, for example, a program for reading brake pulse waveform data and attenuation additional pulse waveform data to generate an actuator drive signal that generates vibration corresponding to the contact information when information indicating a touch condition is input from the operation device or strain detection sensor 70; a program for generating an actuator drive signal corresponding to the contact information by combining the read data; and a program for supplying the generated actuator drive signal to the coil. The actuator drive signal is applied to the coil via a driver that drives the electromagnetic actuator as a combination of a plurality of current pulses. The CPU may use these programs and data to control the operation of the components of the vibration presenting device, and may control the current pulse supply unit and the voltage pulse application unit.

<Vibration Operation by the Control Device>

Control device 1 supplies the current pulse to coil 22 to drive movable part 40 in one direction of vibration. By supplying the current pulse to coil 22, movable part 40 is displaced in one direction of the vibrating direction against the urging force of plate-shaped elastic parts 50. During the supply of the current pulse, the displacement in one direction of the vibrating direction of movable part 40 is continued. By stopping the supply of the current pulse, that is, turning off the input of the current pulse to coil 22, the force to displace in one direction of the vibration direction of movable part 40 (Z-direction) is released. Turning off the input of the current pulse means that the timing in which the voltage generating the current pulse is turned off. At the moment the voltage is switched off, the current pulses are not completely switched off but attenuated. Movable part 40 is displaced to move to the other direction (Z-direction plus side) of the vibrating direction by the urging force of plate-shaped elastic parts 50 accumulated at the maximum displaceable position in the drawn direction (Z-direction minus side). Strong vibration is propagated to the operation device through movable part 40 which has moved to the other direction side which is the operation device side, and the haptic feeling is given to the operator. Control device 1 supplies a plurality of current pulses to coil 22 including the main drive pulse as a first pulse and a sub drive pulse (brake pulse, attenuation additional pulse) as a second and subsequent pulses in response to touching screen 2a by the operator. In the vibration of movable part 40, by supplying the main drive pulse, and further supplying the sub-drive pulse after supplying the main drive pulse, control device 1 adjusts the vibration that remains after stopping the supply of the main drive pulse, so-called vibration attenuation period.

<Supplying Main Drive Pulse>

Figure 11:
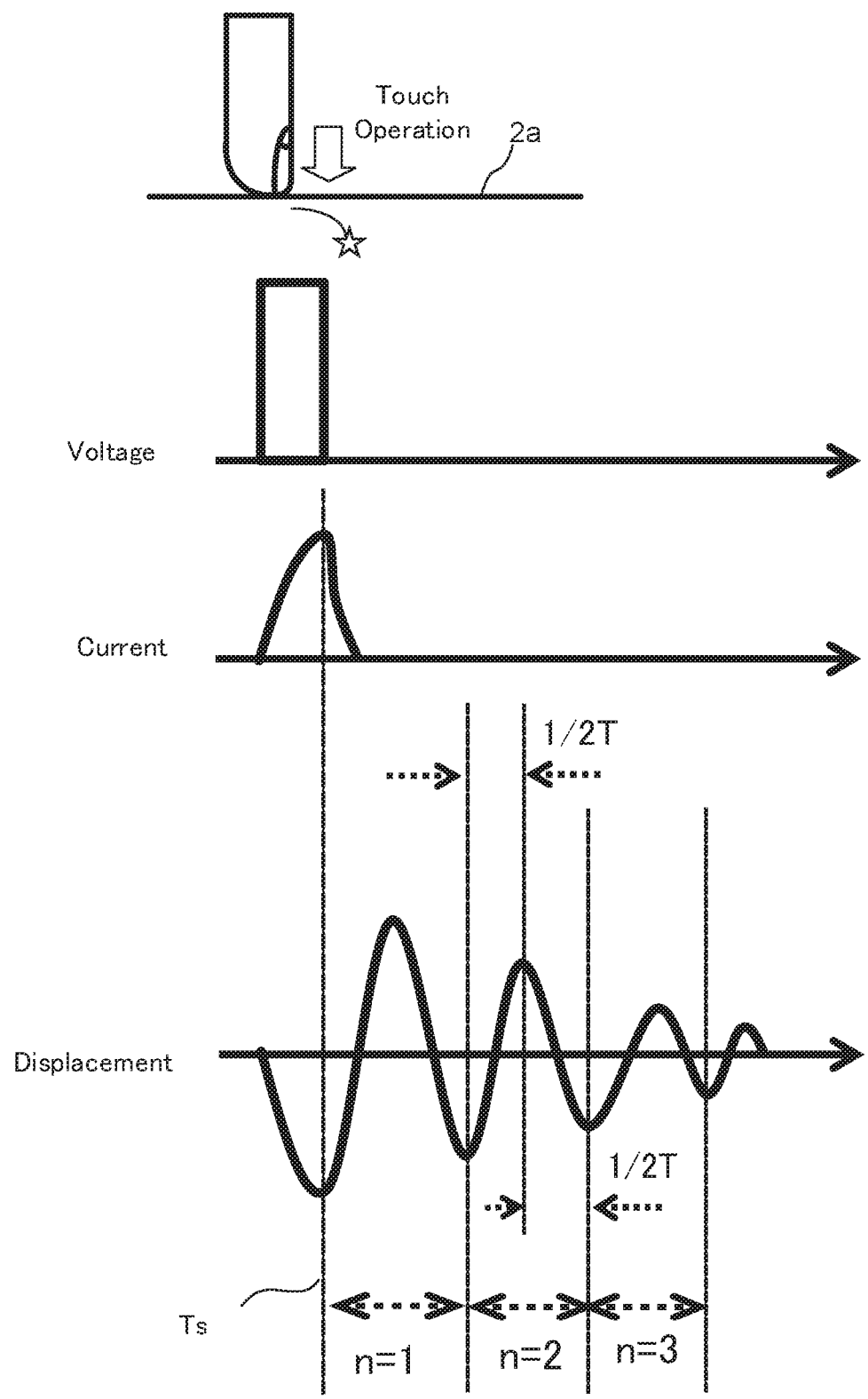
FIG. 11 is a diagram for explaining a displacement of a movable part when supplying a main current pulse to the electromagnetic actuator.

FIG. 11 is a diagram for explaining the displacement of movable part when supplying the main drive pulse to the electromagnetic actuator. Control unit 1 supplies the main drive pulses to coil 22 in response to touching screen 2a by the operator. Thus, movable part 40 is driven in response to the main drive pulse, displaced as shown in FIG. 11, i.e. vibrated, thereby the vibration attenuation period is generated. Thus, control device 1 gives various types of haptic feeling when the operator touches the operation device by adjusting a strength of the vibration attenuation, a length of the vibrating attenuation period, or a presence or absence of the vibrating attenuation period.

Here, the vibration period T in electromagnetic actuator 10 is shown by the following Expression (3) in which the mass of movable part 40 which is a portion to be movable (here is described by movable part 40 for convenience even though including touch panel 2) is "m" and the spring constant of a plate spring which is plate-shaped elastic part 50 for elastically supporting movable part 40 is "Ks."

[Expression 3]

$$T = 2\pi \sqrt{\frac{m}{Ks}} \qquad (3)$$

In the present embodiment, the vibration period T is an interval from timing of the maximum displacement of the negative side to timing of the next maximum displacement.

<Supplying Sub-Drive Pulse>

After the main drive pulse is supplied, the second and subsequent current pulses for supplying to coil 22 are supplied to coil 22 at a predetermined timing as sub drive pulses (brake pulses and attenuation additional pulses). In other words, the current pulse supply unit supplies the drive current pulse (brake pulse, attenuation additional pulse) as the sub-drive current pulse capable of adjusting attenuation duration of the elastic vibration after supplying the drive current pulse as the main drive current pulse capable of starting the elastic vibration.

This adjusts the attenuation period of the vibration caused by the main drive pulse. That is, the sub-drive pulses adjust the magnitude and the length of the free vibration following the main vibration by the main drive pulse.

The predetermined timing is set from timing Ts in which the main drive pulse as the first pulse supplied to coil 22 is turned off to range of ½T before and after timing of the maximum displacement (peak) on the positive side in the vibration period T(n) of the elastic vibration by plate-shaped elastic parts 50 supporting touch panel 2 and movable part 40. The predetermined timing can be said that timing excludes the timing of the maximum displacement amount (peak) of the positive side and the negative side. Thus, the operation device is vibrated to give a variety of the haptic feeling to the operator.

<Supplying Brake Pulse>

The brake pulse can attenuate the vibration caused by the current pulse, is intended to supply so as to shorten the attenuation period of the vibration caused by the main drive pulse in the present embodiment.

Specifically, control device 1 sets input (supply) timing of the second and subsequent current pulses to be supplied to coil 22 among the plurality of current pulses after supplying the main drive pulse to coil 22. More specifically, the input (supply) timing of the second pulse subsequent current pulses is set from timing Ts that the main drive pulse of the first pulse is turned off to range of the vibration period T(n−1) to T(n−1)+½T (n is a natural number). Here, n indicates timing of the vibration period of the current pulse supplied as a sub-drive pulse (brake pulse) in a plurality of current pulse trains that are electromagnetic actuator drive signal. Note that if n is a natural number of 2 or more, the attenuation period of the vibration after the maximum displacement of the positive side by the main drive pulse can be shortened without attenuating the maximum displacement of the positive side by the main drive pulse of the first pulse.

For example, when n=2, during the displacement from the maximum displacement amount side of the negative side (one directional side) to the maximum displacement amount side of the positive side (the other directional side) in the second vibration period among the second and subsequent vibration periods, movable part 40 is displaced to the maximum displacement amount side of the negative side (one directional side) to brake. Thus, the amplitude of movable part 40 (the length up to the maximum displacement amount of the negative side) is shortened during the attenuation period of the main drive pulse, thereby the vibration during the attenuation period is suppressed, the attenuation period is shortened and it is possible to give the vibration that becomes shape haptic feeling.

Figure 12:
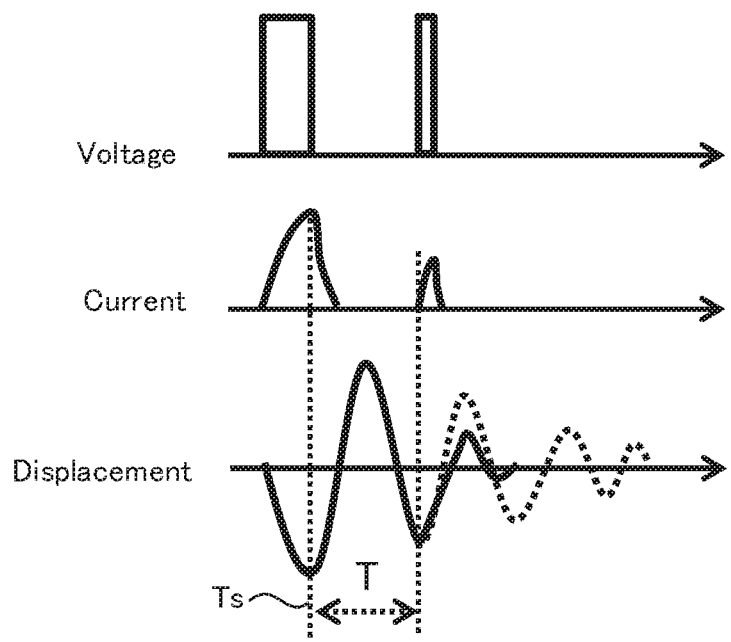
FIG. 12 is a diagram showing an example of an electromagnetic actuator drive signal input to the electromagnetic actuator of the control device according to an embodiment of the present invention.

FIG. 12 is a diagram showing an example of the electromagnetic actuator drive signal that is input to the electromagnetic actuator of the control device according to an embodiment of the present invention. Note that, in the displacement amount (see FIG. 11) of the movable part (including the operation device) at the time of supplying the main drive pulse, FIG. 12 shows a pattern of supplying the brake pulse in the second period of the vibration period of the electromagnetic actuator, n=2.

In FIG. 12, control device 1 sets the supply timing of the second current pulse within a period of displacement from the maximum displacement amount (peak) of the negative side to the maximum displacement amount (peak) of the positive side during the attenuation period of the vibration by the main drive pulse after the main drive pulse is supplied to coil 22. Specifically, the second pulse is supplied from the maximum displacement amount (after T) on the negative side of the second period of the vibration period to the maximum displacement amount (peak) on the positive side. That is, the brake pulse exerts a suction force in the negative direction with respect to movable part 40 which is moving from the negative side to the positive side. Note that the current pulses are not supplied at peak of the displacement of movable part 40. When the vibration displacement (corresponding to the displacement of movable part 40) reaches the positive peak, the supply of the current pulse is turned off. In the present embodiment, the current pulses are not supplied when the displacement of the vibration is the maximum displacement of the positive or negative side.

This suppresses the following displacement after peak of the displacement caused by the main drive pulse. The vibration attenuation period is shortened. Therefore, the operator is given the sharp haptic feeling.

Figure 13:
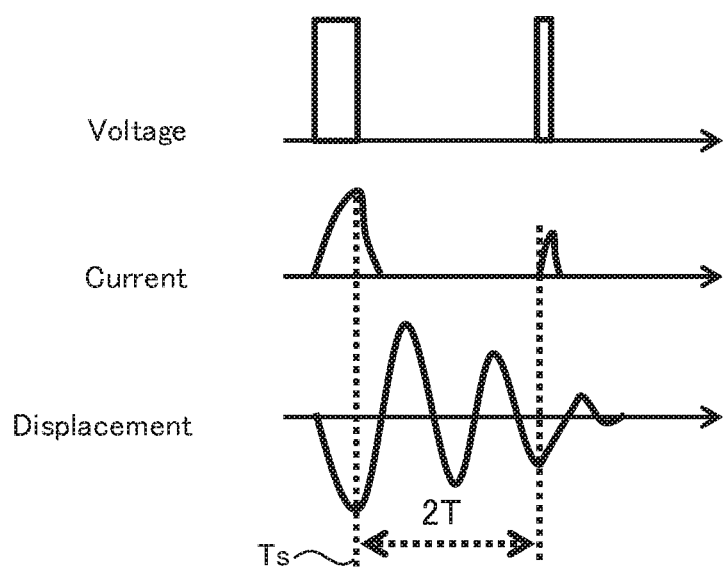
FIG. 13 is a diagram showing an example of an electromagnetic actuator drive signal input to the electromagnetic actuator of the control device according to an embodiment of the present invention.

FIG. 13 is a diagram showing an example of the electromagnetic actuator drive signal that is input to the electromagnetic actuator of the control device according to an embodiment of the present invention. FIG. 13 shows a pattern of supplying the brake pulse in the third period of the vibration period of the electromagnetic actuator, n=3 regarding an attenuation part of the main vibration of the movable part (including the operation device) at the time of supplying the main drive pulse.

The supply timing of the second current pulse is set within a period of displacement from the maximum displacement amount (peak) of the negative side of the third period of the attenuation period of the vibration by the main drive pulse to the maximum displacement amount (peak) of the positive side after the main drive pulse is supplied to coil 22. Note that when the displacement reaches the maximum displacement amount (peak) of the positive side, the supply of the current pulse is turned off. That is, at the time of the vibration period after the second pulse, during the displacement from the maximum displacement amount of the negative side (one directional side) to the maximum displacement amount of the positive side (the other directional side), movable part 40 is displaced to the maximum displacement amount side of the negative side (one directional side) to brake. Note that the displacement to the maximum displacement amount side of the negative side is the displacement to the one direction side of movable part 40 (Z-direction minus side), the displacement to the maximum displacement amount side of the positive side is the displacement to the other direction side of movable part 40 (Z-direction plus side). Thus, the amplitude of movable part 40 (the length up to the maximum displacement amount of the negative side) is shortened during the attenuation period of the vibration, thereby the vibration during the attenuation period is suppressed, the attenuation period is shortened and it is possible to give the vibration that becomes shape haptic feeling after giving the main vibration.

<Supply of Attenuation Additional Pulse>

Attenuation additional pulses attenuate the vibration caused by the current pulse. In the present embodiment, the attenuation additional pulses are supplied to increase attenuation period of the vibration supplied by the main drive pulse. When supplying the attenuation additional pulses, control device 1 sets input (supply) timing of the second and subsequent current pulses to be supplied to coil 22 among the plurality of current pulses. Specifically, the input (supply) timing of the second and subsequent current pulses is set from timing Ts that the main drive pulse of the first pulse is turned off to range of the vibration period $T(n-1)+\frac{1}{2}T$ to $T(n-1)+T$ (n is a natural number). Here, n indicates timing of the vibration period of the current pulse supplied as a sub-drive pulse (attenuation additional pulse) in a plurality of current pulse trains that are electromagnetic actuator drive signal.

Control device 1 sets the supply timing of the second and subsequent current pulses within a period of displacement from the maximum displacement amount (peak) of the positive side to the maximum displacement amount (peak) of the negative side during the attenuation period of the vibration by the main drive pulse after the main drive pulse is supplied to coil 22. That is, during the displacement from the maximum displacement amount of the positive side to the maximum displacement amount of the negative side (from the other directional side to one directional side) in the vibration period among the second and subsequent vibration periods, an urging force to the maximum displacement amount side of the negative side (one directional side) for movable part 40 is added to help the displacement to the maximum displacement amount side of the negative side.

Thus, the amplitude of movable part 40 is increased during the attenuation period of the vibration, thereby a period to give the haptic feeling by the vibration to the operator is increased and it is possible to express the vibration that becomes deep haptic feeling.

Figure 14:
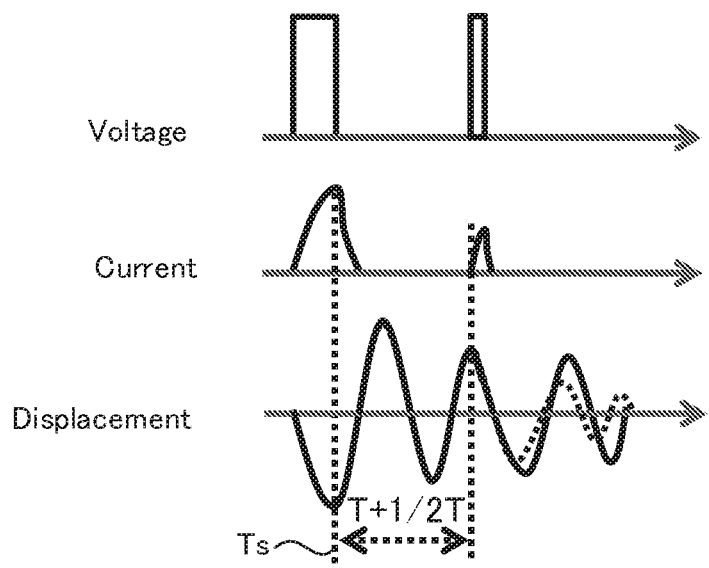
FIG. 14 is a diagram showing an example of an electromagnetic actuator drive signal input to the electromagnetic actuator of the control device according to an embodiment of the present invention.

FIG. 14 is a diagram showing an example of the electromagnetic actuator drive signal that is input to the electromagnetic actuator of the control device according to an embodiment of the present invention. In the displacement amount (see FIG. 11) of the movable part (including the operation device) at the time of supplying the main drive pulse, FIG. 14 shows a pattern of supplying the attenuation additional pulse in the second period of the vibration period of the electromagnetic actuator, n=2.

The electromagnetic actuator drive signal shown in FIG. 14 provides the attenuation additional pulse after the main drive pulse is supplied.

In FIG. 14, control device 1 supplies a current pulse as the attenuation additional pulse of the second pulse supplied to coil 22 when supplying the attenuation additional pulse after supplying the main drive pulse.

Thus, as shown in FIG. 14, while movable part 40 is displaced from the maximum displacement amount of the positive side of the second period to the maximum displacement amount of the negative side of the third period, i.e., in the course of displacing movable part 40 to one direction (a direction for urging, the negative side) after the maximum displacement amount of the positive side of the second period, the current pulse is supplied to coil 22. That is, the urging force is increased, movable part 40 is displaced to the maximum displacement amount side of the negative side, the maximum displacement amount of the negative side becomes deeper than the vibration period during attenuation period, and the vibration further continues.

This allows the vibration attenuation period to be longer than attenuation period of the vibration for main drive pulses only, thereby it is possible to give the deep haptic feeling to the operator.

Figure 15:
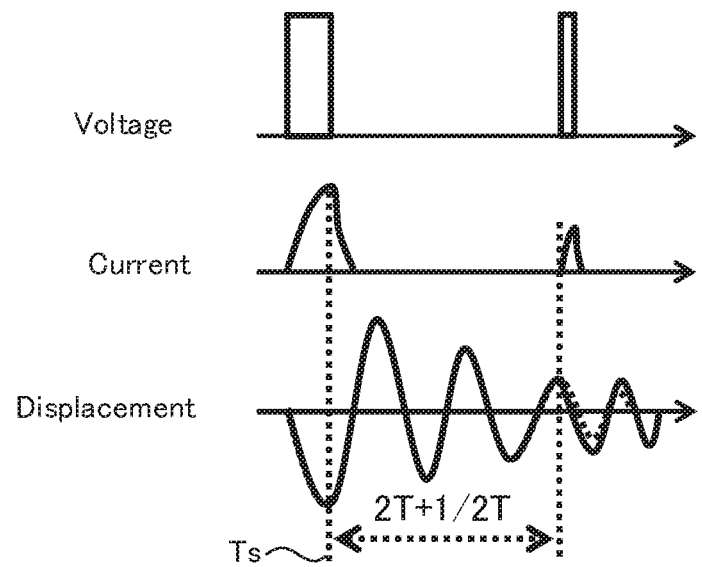
FIG. 15 is a diagram showing an example of an electromagnetic actuator drive signal input to the electromagnetic actuator of the control device according to an embodiment of the present invention.

FIG. 15 is a diagram showing an example of the electromagnetic actuator drive signal that is input to the electromagnetic actuator of the control device according to an embodiment of the present invention. In the displacement amount (see FIG. 11) of the movable part (including the operation device) at the time of supplying the main drive pulse, FIG. 15 shows a pattern of supplying the attenuation additional pulse in the third period of the vibration period of the electromagnetic actuator, n=3.

The supply timing of the second current pulse is set within a period of displacement from the maximum displacement amount (peak) of the positive side of the third period of the attenuation period of the vibration by the main drive pulse to the maximum displacement amount (peak) of the negative side of the third period after the main drive pulse is supplied to coil 22. Note that when the displacement reaches the maximum displacement amounts of the positive and negative side, the supply of the current pulse is turned off.

That is, during the displacement from the maximum displacement amount of the positive side (the other directional side) to the maximum displacement amount of the negative side (one directional side) in the second and subsequent vibration periods, movable part 40 is displaced to the maximum displacement amount of the negative side (one directional side) to brake. Thus, the amplitude of movable part 40 (the length up to the maximum displacement amount of the negative side) is increased during the attenuation period of the vibration, the urging force is increased, the attenuation period becomes longer and it is possible to express the vibration that becomes deep haptic feeling after giving the main vibration.

Thus, in an actuator drive signal having a plurality of current pulses including a main drive pulse, the vibration attenuation period can be varied depending on whether the brake pulse is supplied, the attenuation additional pulse is supplied, or both are supplied at timing of the vibration period T(n−1) corresponding to the main drive pulse train to be supplied. Therefore, it is possible to realize the expression of vibration of various touch operation feeling.

<Supplying Brake Pulse+Attenuation Additional Pulse>

Figure 16:
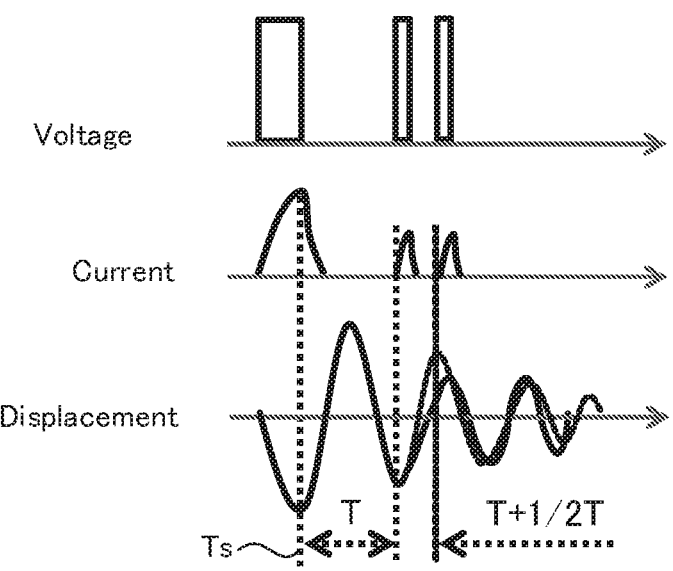
FIG. 16 is a diagram showing an example of an electromagnetic actuator drive signal input to the electromagnetic actuator of the control device according to an embodiment of the present invention.
Figure 17:
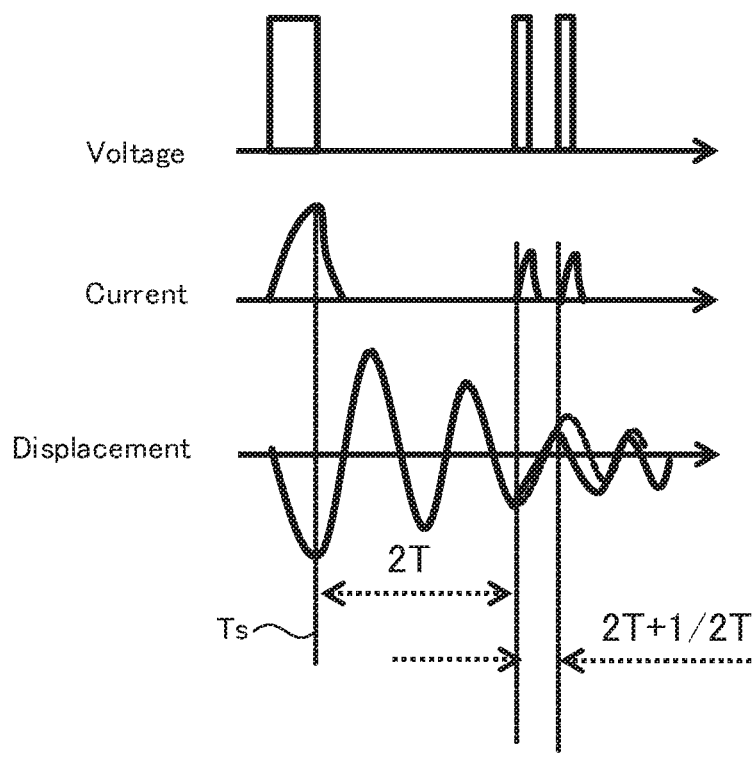
FIG. 17 is a diagram showing an example of an electromagnetic actuator drive signal input to the electromagnetic actuator of the control device according to an embodiment of the present invention.

FIGS. 16 and 17 are diagrams showing an example of the electromagnetic actuator drive signal input to the electromagnetic actuator of the control device according to an embodiment of the present invention. These show an example in which the attenuation period of the elastic vibration is adjusted by the brake pulse and the attenuation additional pulse.

When the attenuation of the vibration is adjusted using both the brake pulse and the attenuation additional pulse, the supply timing of the brake pulse ranges from $T(n-1)$ to $T(n-1)+\frac{1}{2}T$ (where n is a natural number) after the main drive current pulse is turned off in the elastic vibration. Further, the supply timing of the attenuation additional pulse ranges from $T(n-1)+\frac{1}{2}T$ to $T(n-1)+T$ (where n is a natural number) after the main drive current pulse is turned off in the elastic vibration.

In FIG. 16, coil 22 is supplied the brake pulses and the attenuation additional pulses as sub-drive pulses thereto. Note that the n for determining the supply timing of the brake pulse may be different or the same as the n for determining the supply timing of the attenuation additional pulse. For example, the supply timing of the brake pulse is set to n1=2, and the main drive current pulse is turned off. Then, it is added to the second period of the vibration period within the range of $T(n-1)$ to $T(n-1)+\frac{1}{2}T$. In addition, the supply timing of the attenuation additional pulse is set to n2=2, and after the main drive pulse is turned off, it is added to the second period of vibration period within the range of $T(n-1)+\frac{1}{2}T$ to $T(n-1)+T$.

Thus, FIG. 16 shows a pattern of the current pulse train in which the brake pulse and the attenuation additional pulse are added on the second period of the vibration period based on the respective supply conditions, and the displacement of the elastic vibration due to the pattern (corresponding to the displacement of movable part 40). This makes the attenuation of the vibration after the vibration feedback by the main drive pulse shorter by the brake pulse and longer by the attenuation additional pulse. As a result, it is possible to give a sharp and deep haptic feeling to the operator.

In FIG. 17, coil 22 is supplied the brake pulses and the attenuation additional pulses as sub-drive pulses thereto. The supply timing of the brake pulse is set to n1=3, and the supply timing of the attenuation additional pulse is set to n2=3, and this shows a pattern in which both the brake pulse and the attenuation additional pulse are added to the third period of the vibration, and the displacement of the elastic vibration due to the pattern. The pattern shown in FIG. 17 differs from the pattern in FIG. 16 in that the attenuation of the vibration after the vibration feedback by the main drive pulse is shortened by the brake pulse and lengthened by the attenuation additional pulse. This makes it possible to give a deep haptic feeling to the operator in addition to a sharp haptic feeling.

Thus, control device 1 can provide the sharp and deep haptic feeling by the brake pulse with various variation.

Figure 18:
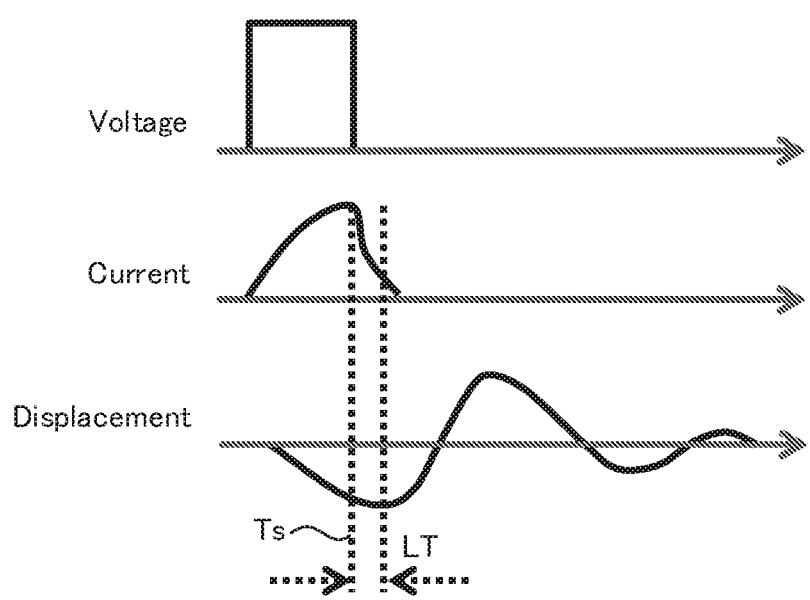
FIG. 18 is a diagram for explaining a supply timing of a sub-drive pulse.

FIG. 18 is a diagram for explaining a supply timing of the sub-drive pulse. Note that in electromagnetic actuator 10, when the inductance is increased, timing (vibration period, or half cycle) in which the displacement of movable part 40 is maximized (peak) may be delayed from timing Ts in which the current pulse is turned off by the transient current. In such cases, the supply timing of the sub-drive pulse corresponding to the vibration period deviates from the actual vibration period.

In contrast, control device 1 is provided with a delay time LT in the input timing of the second and subsequent current pulses. That is, when supplying the brake pulse or the attenuation additional pulse which is the current pulse of the second pulse after supplying the main drive pulse, the brake pulse or the attenuation additional pulse is supplied at timing which has the delay time LT from timing Ts in which the main drive pulse is turned off. That is, when supplying the brake pulse, the supply timing of the brake pulse ranges from T(n−1) to T(n−1)+½T after the predetermined delay time LT has elapsed after the main drive pulse is turned off (timing Ts). Further, when supplying the attenuation additional pulse, the supply timing of the attenuation additional pulse ranges from T(n−1)+½T to T(n−1) after the predetermined delay time LT has elapsed after the main drive pulse is turned off (timing Ts).

Thus, the supply timing of the sub-drive pulse can be matched to the actual vibration period or half cycle, it is possible to perform attenuation adjust of the preferred vibration to provide an excellent haptic feeling.

In vibration presenting device, when the operator touches the operation device, control device 1 vibrates the touch point in response to the touch to give the haptic feeling to the operator.

Specifically, touch position information and/or touch information indicating that the operator has touched from strain detection sensor 70 is input to control device 1. Control device 1 receives the touch information and drives the electromagnetic actuator to generate vibration. The actuator drive signal that generates vibration is formed corresponding to the touch information.

Control device 1 generates the actuator drive signal using the main drive pulses, the brake pulses, and the attenuation additional pulses described above. The main drive pulse, the brake pulse, and the attenuation additional pulse may be combined in any configuration that combines the main drive pulse with the sub drive pulse (the brake pulse, the attenuation additional pulse) to form the electromagnetic actuator drive signal. The main drive pulse, the brake pulse, and the attenuation additional pulse may be configured in advance a plurality of types, which differ in amplitude and pulse width, respectively, and the main drive pulse and the sub drive pulse may be combined in any way.

Figure 19:
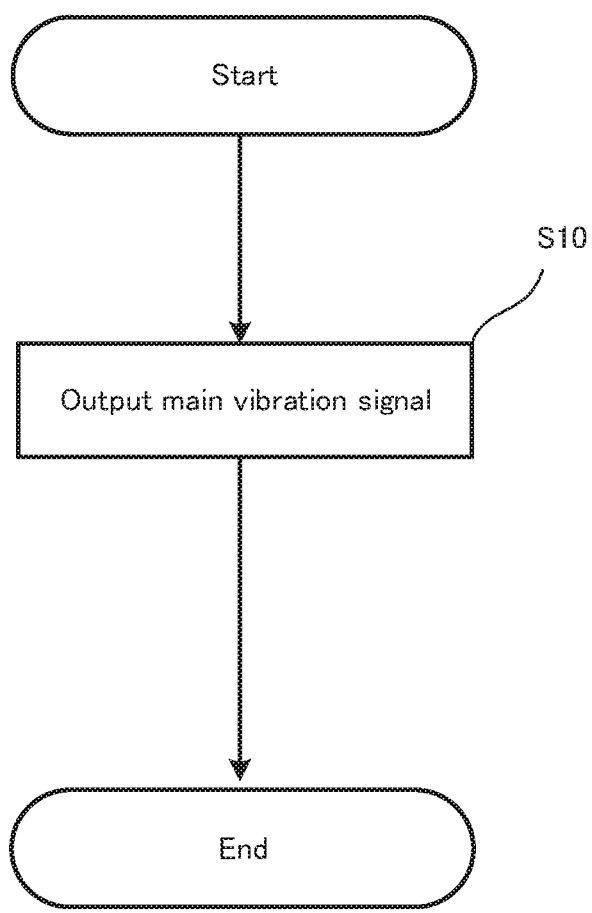
FIG. 19 is a flowchart showing an example of an operation for driving the electromagnetic actuator by the control device according to an embodiment of the present invention.

FIGS. 19 and 20 are flowcharts showing an example of operations for driving electromagnetic actuator 10 by control device 1 according to an embodiment of the present invention. With operation shown in FIGS. 19 and 20, control device 1 drives electromagnetic actuator 10 to generate feedback vibrations.

Note that in FIGS. 19 and 20, the main drive pulse, the brake pulse and the attenuation additional pulse are described as the main vibration signal, the vibration attenuation period brake signal and the vibration attenuation period addition signal from their function.

When the main drive pulse is supplied to the electromagnetic actuator (specifically, coils 22), as shown in FIG. 19, control device 1 outputs the main vibration signal, which is the main drive pulse, as the actuator drive signal when the operator touches the operation device (step S10). The output main vibration signal is supplied to coil 22 to generate an electromagnetic force, movable part 40 is driven to vibrate. The vibration is fed back as a main vibration to the operator via the operation device, and is given as a haptic feeling to the operator.

Note that the displacement of movable part 40 by the main drive pulse supplied to coil 22 reaches peak of the maximum displacement in the positive direction by the main drive pulse, and is attenuated after generating a feedback vibration (see FIG. 11).

Figures 20A, 20B, 20C:
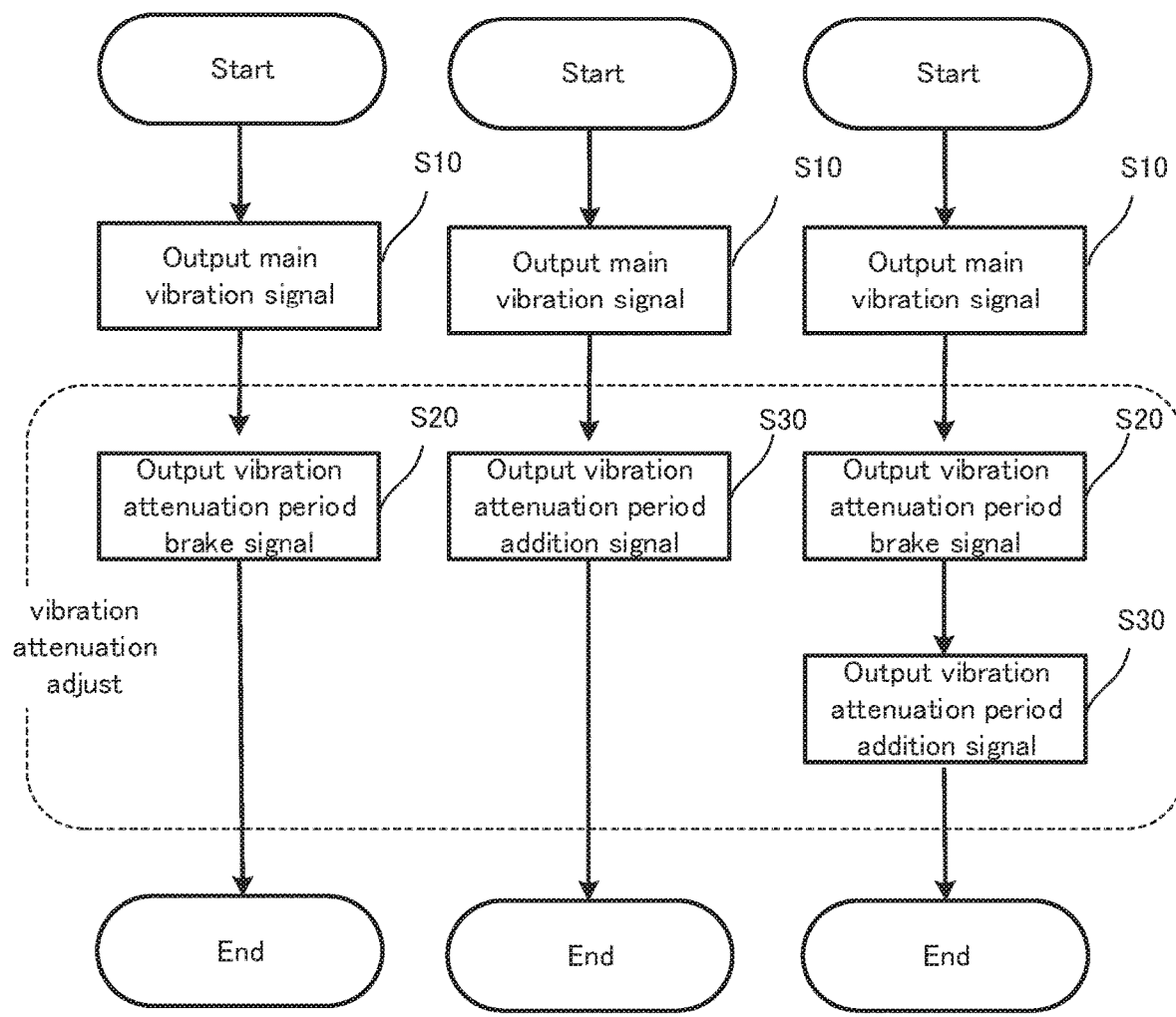
FIG. 20A is a flowchart showing an example of an operation for driving the electromagnetic actuator by the control device according to an embodiment of the present invention.
FIG. 20B is a flowchart showing an example of an operation for driving the electromagnetic actuator by the control device according to an embodiment of the present invention.
FIG. 20C is a flowchart showing an example of an operation for driving the electromagnetic actuator by the control device according to an embodiment of the present invention.

FIGS. 20A-20C show control generating vibrations with adjust of attenuation period of the vibration being fed back. As shown in FIGS. 20A to 20C, after outputting the main vibration (step S10), attenuation period of the vibration is adjusted. As steps for adjusting the vibration attenuation period, after the step S10 for outputting the main drive signal, it is possible to appropriately combine a step S20 for supplying the vibration attenuation period brake signal and a step S30 for outputting the vibration attenuation period addition signal as the vibration attenuation adjust. This allows attenuation of the vibration to be adjusted to produce various vibration pattern, gives a variety of haptic feelings.

Thus, according to the present embodiment, it is possible to reduce the cost without using a magnet or the like, while reducing the cost of the entire device, it is possible to express the vibration of various touch operation feeling. Further, according to the present embodiment, it is possible to increase the output by efficient driving even in a small product. In addition, low power consumption can be realized.

It is possible to efficiently generate a thrust force of movable part 40 suitable for a haptic feeling to the operator who operates the operation device while reducing the cost.

Thus, in the present embodiment, the vibration to be a variety of touch operation feeling is not adjusted by an attenuation material such as rubber. The attenuation material results in a single vibration attenuation period depending on the attenuation material itself, but this is not the case in the present embodiment. The poor variation of the vibration attenuation period limits the type of the operation feeling to be expressed, but this is not the case in the present embodiment. In addition, there is no change in resonant frequencies due to individual differences in the attenuation materials, and the characteristics of the resonant frequencies do not differ from product to product.

It is preferable that a plurality of plate-shaped elastic parts 50 is fixed at positions symmetrical with respect to the center of movable part 40, but as described above, one plate-shaped elastic part 50 may support movable part 40 so as to be able to vibrate with respect to fixing part 30. Plate-shaped elastic part 50 may include at least two or more arm portions connecting movable part 40 and fixing part 30 and having bellows-shaped elastic arm parts 56. Plate-shaped elastic part 50 may be made of a magnetic material. In this case, movable-part side fixing parts 54 of plate-shaped elastic parts 50 are respectively arranged in a winding axis direction of coil 22, or, in a direction perpendicular to the winding axis direction with respect to both end portions of core 24. Movable-part side fixing part 54s of plate-shaped elastic parts 50 form the magnetic paths together with core 24 when coil 22 is energized.

Further, in the configuration of electromagnetic actuator 10, rivets may be used instead of the screws 62, 64, 68 for fixing of base part 32 and plate-shaped elastic part 50, and, fixing of plate-shaped elastic part 50 and movable part 40. Rivets consist of a head and a body without a screw part, and are inserted into holes of a members, and members are joined together by plastically deforming by caulking the opposite end of the rivets. The caulking may be performed using, for example, a press machine, a dedicated tool, or the like.

Based on strain data obtained by strain detection sensor 70, it may be possible to perform correction of the period of the input pulse due to individual differences of the components in electromagnetic actuator 10.

As described above, embodiments of the present invention have been described. Note that the above description is illustrative of a preferred embodiment of the present invention, and the scope of the present invention is not limited thereto. That is, the configuration of the device and the shape of each part are only examples, and it is obvious that various modifications and additions to these examples are possible within the scope of the present invention.

In the present embodiment, although the driving direction of the electromagnetic actuator controlled driving by control device 1 is the Z direction, the present invention is not limited thereto. It is possible to obtain the effects such as the above-described efficient driving and strengthening of the vibration even in the direction parallel to the touch surface of the operator, specifically, X-direction or Y-direction.

INDUSTRIAL APPLICABILITY

The electromagnetic actuator according to the present invention has an effect capable of expressing vibrations of various touch feelings. For example, in automotive products and industrial equipment, it is useful for operation devices in which operations are input by touching a finger or the like to an image on a screen, such as a touch display device equipped with a touch panel device that can feed back a sense of operation similar to the sense of operation when touching various images such as a mechanical switch displayed on the image.

REFERENCE SIGNS LIST

1 Control device
10 Electromagnetic actuator
20 Core assembly
20a, 20b Counter surface (Counter surface part)
22 Coil
24 Core
26 Bobbin
30 Fixing part
32 Base part
32a Attaching part
32b Bottom surface part
33 Fastening hole
36 Opening part
40 Movable part
41 Yoke
42 Surface-part fixing hole
44 Surface-part fixing part
44a Fixing surface
46, 47 Attracted surface part
48 Opening part
49 Cutout
50 Plate-shaped elastic part (elastic support part)
52 Fixing-part side fixing part
54 Movable-part side fixing part
56 Bellows-shaped elastic arm part
70 Strain detection sensor
82 Switching element
84 Signal generating unit
200 Vibration presenting device
241 Core main body
242, 244 Magnetic pole part
321, 322 Fixing hole

What is claimed is:

1. An electromagnetic actuator comprising:
   control circuitry configured to act as a current pulse supply unit operable to, in accordance with a touch operation of an operation device supported so as to be elastically vibrated, supply a main driving current pulse and a sub-driving current pulse, both of which are driving current pulses for driving the operation device in one direction in a vibrating direction thereof, to a coil of an electromagnetic actuator, the main driving current pulse being capable of starting an elastic vibration, and the sub-driving current pulse being capable of adjusting attenuation period of the elastic vibration after the starting the elastic vibration;
   a core assembly including a core formed from a magnetic material and a coil wound around the core, the driving current pulses being supplied to the coil from the control device, and both ends of the core being projected from the coil in a direction of winding axis;
   a yoke formed from a magnetic material and disposed to face the both ends with a gap therebetween in an opposing direction perpendicular to the direction of the winding axis; and
   an elastic support part fixed between the core assembly and the yoke, and configured to support the core assembly and the yoke so as to be elastically vibrated in the vibration direction along the opposing direction.

2. The electromagnetic actuator according to claim 1, the current pulse supply unit is configured to supply the sub-drive current pulse during the elastic vibration after turning off the main drive current pulse.

3. The electromagnetic actuator according to claim 1, the current pulse supply unit is configured to supply the sub-drive current pulse when the elastic vibration of the n-th period (n is a natural number) after turning off the main drive current pulse, and
a supplying timing of the sub-drive current pulse is in the range from $T(n-1)$ to $T(n-1)\pm\frac{1}{2}T$ after the main drive current pulse is turned off,
where, in the elastic vibration, the mass of the yoke is m, the spring constant of an elastic support part configured to support the operation device so as to be elastically vibrated is Ks, and the vibration period is $T=2\pi\sqrt{(m/K(s))}$.

4. The electromagnetic actuator according to claim 1, the current pulse supply unit is configured to supply the sub-drive current pulse when the elastic vibration of the n-th period (n is a natural number) after turning off the main drive current pulse, and
a supplying timing of the sub-drive current pulse is in the range from $T(n-1)+\frac{1}{2}T$ to $T(n-1)+T$ after the main drive current pulse is turned off,
where, in the elastic vibration, the mass of the yoke is m, the spring constant of an elastic support part configured to support the operation device so as to be elastically vibrated is Ks, and the vibration period is $T=2\pi\sqrt{(m/K(s))}$.

5. The electromagnetic actuator according to claim 3, a pulse width of the sub-drive current pulse is $\frac{1}{2}T$ or less.

6. The electromagnetic actuator according to claim 3, a supply timing of the sub-drive current pulse is in the range from $T(n-1)$ to $T(n-1)+\frac{1}{2}T$ after a predetermined delay time has elapsed after the main drive current pulse is turned off.

7. The electromagnetic actuator according to claim 4, a supply timing of the sub-drive current pulse is in the range from $T(n-1)+\frac{1}{2}T$ to $T(n-1)+T$ after a predetermined delay time has elapsed after the main drive current pulse is turned off.

8. The electromagnetic actuator according to claim 1, a shape of the magnetic material of the core is a flat shape extending in an orthogonal direction orthogonal to the vibration direction, and
a shape of the coil is a flat shape extending along with the flat shape of the core.

9. The electromagnetic actuator according to claim 8, a shape of the magnetic material of the yoke and a shape of the elastic support part are a plate shape extending in the orthogonal direction.

\* \* \* \* \*